United States Patent
Goshoo et al.

(10) Patent No.: US 7,807,105 B2
(45) Date of Patent: Oct. 5, 2010

(54) SUBSTRATE FOR BIOCHIP

(75) Inventors: Yasuhiro Goshoo, Tokyo (JP); Takaaki Kuroiwa, Tokyo (JP); Naohiro Ishikawa, Tokyo (JP); Daisuke Obara, Tokyo (JP); Shinsuke Yamasaki, Tokyo (JP); Françoise Vinet, Grenoble (FR)

(73) Assignee: Yamatake Corporation, Tokyo (JP)

( * ) Notice: Subject to any disclaimer, the term of this patent is extended or adjusted under 35 U.S.C. 154(b) by 944 days.

(21) Appl. No.: 11/631,646

(22) PCT Filed: Dec. 16, 2004

(86) PCT No.: PCT/JP2004/019285

§ 371 (c)(1), (2), (4) Date: Jan. 5, 2007

(87) PCT Pub. No.: WO2006/006262

PCT Pub. Date: Jan. 19, 2006

(65) Prior Publication Data

US 2008/0253928 A1 Oct. 16, 2008

(30) Foreign Application Priority Data

Jul. 8, 2004 (EP) .................................. 04291742

(51) Int. Cl.
*G01N 33/48* (2006.01)

(52) U.S. Cl. .................................... 422/68.1; 422/99
(58) Field of Classification Search ............... 422/68.1, 422/99
See application file for complete search history.

(56) References Cited

U.S. PATENT DOCUMENTS

| 5,846,396 A | 12/1998 | Zanzucchi et al. |
| 6,602,714 B1 | 8/2003 | Tagge et al. |
| 6,752,966 B1 | 6/2004 | Chazan |
| 2004/0149688 A1* | 8/2004 | Fuchs et al. .................. 216/56 |

FOREIGN PATENT DOCUMENTS

FR    2 787 581    6/2000

* cited by examiner

*Primary Examiner*—Lyle A Alexander
(74) *Attorney, Agent, or Firm*—The Nath Law Group; Jerald L. Meyer; Stanley N. Protigal

(57) ABSTRACT

A substrate for biochips has a substrate surface having a reaction region capable of reacting with biological substances and a non-reaction region not reacting with the biological substances, sunken bottomed wells formed in the substrate surface, and a layer of a material capable of reacting with the biological substances having a surface exposed only at the bottoms of the bottomed wells, the exposed surface forming the reaction region.

13 Claims, 52 Drawing Sheets

FIG.47
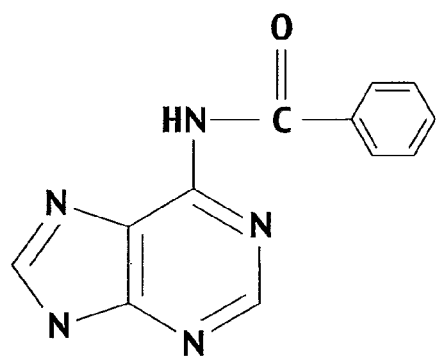
Protected Adenine
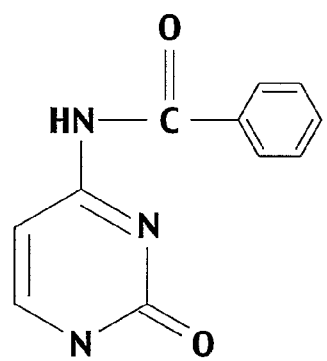
Protected Cytosine
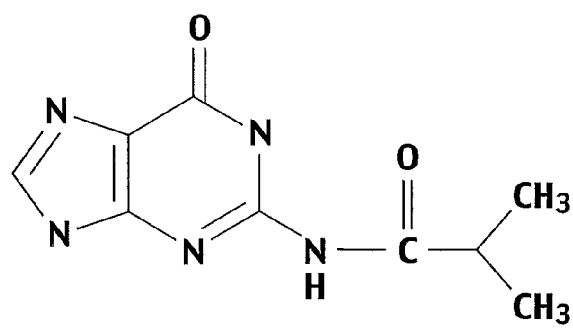
Protected Guanine

FIG.55
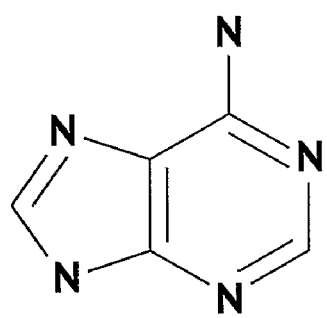
Adenine
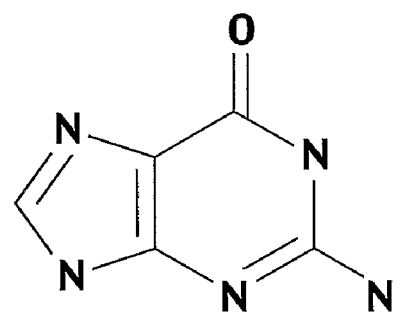
Guanine
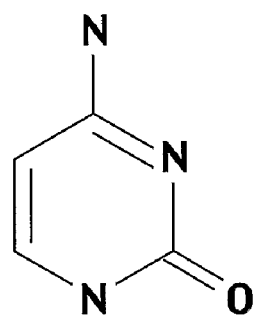
Cytosine

SEQUENCE LISTING

```
<160> NUMBER OF SEQ ID NOS: 6

<210> SEQ ID NO 1
<211> LENGTH: 18
<212> TYPE: DNA
<213> ORGANISM: Artificial Sequence
<220> FEATURE:
<223> OTHER INFORMATION: DescriptiOn Of Artificial Sequence: Synthetic
      DNA

<400> SEQUENCE: 1
atctcacacg tcaaatag                                                  18

<210> SEQ ID NO 2
<211> LENGTH: 15
<212> TYPE: DNA
<213> ORGANISM: Artificial Sequence
<220> FEATURE:
<223> OTHER INFORMATION: DescriptiOn Of Artificial Sequence: Synthetic
      DNA

<400> SEQUENCE: 2
atctcactca aatag                                                     15

<210> SEQ ID NO 3
<211> LENGTH: 15
<212> TYPE: DNA
<213> ORGANISM: Artificial Sequence
<220> FEATURE:
<223> OTHER INFORMATION: DescriptiOn Of Artificial Sequence: Synthetic
      DNA

<400> SEQUENCE: 3
atctcacgca aatag                                                     15
```

```
<210> SEQ ID NO 4
<211> LENGTH: 15
<212> TYPE: DNA
<213> ORGANISM: Artificial Sequence
<220> FEATURE:
<223> OTHER INFORMATION: DescriptiOn Of Artificial Sequence: Synthetic
      DNA

<400> SEQUENCE: 4
atctcaccca aatag                                                       15

<210> SEQ ID NO 5
<211> LENGTH: 15
<212> TYPE: DNA
<213> ORGANISM: Artificial Sequence
<220> FEATURE:
<223> OTHER INFORMATION: DescriptiOn Of Artificial Sequence: Synthetic
      DNA

<400> SEQUENCE: 5
atctcacaca aatag                                                       15

<210> SEQ ID NO 6
<211> LENGTH: 14
<212> TYPE: DNA
<213> ORGANISM: Artificial Sequence
<220> FEATURE:
<223> OTHER INFORMATION: DescriptiOn Of Artificial Sequence: Synthetic
      DNA

<400> SEQUENCE: 6
atctcaccaa atag                                                        14
```

SUBSTRATE FOR BIOCHIP

TECHNICAL FIELD

The invention relates to a substrate for a biochip, more specifically a substrate used for making the biochip having biological substances fixed at predetermined positions on the substrate and used for obtaining information about various biological samples to be examined. The invention relates in particular to the substrate for the biochip suitable for making a DNA chip by chemically synthesizing probe DNA directly on the substrate.

BACKGROUND ART

"Biochip" is the generic term for devices in which biological substances that chemically react with to-be-detected biological substances in a specific manner are fixed at predetermined positions on a chip surface.

A DNA chip that is a typical example of the biochip is used to detect the types and amounts of target DNA included in blood or cell extract.

The DNA chip has, for example a structure in which thousands to tens of thousands of types of probe DNA, each being single-chain DNA having a known sequence, are arranged in an array on a substrate such as a glass slide.

When a to-be-examined liquid containing fluorescence-marked target DNA is supplied to the DNA chip, only the target DNA which has sequences complementary to the sequences of the probe DNA is fixed by the complementary sequences of target DNA and probe DNA hydrogen-bonding to each other and forming a double chain. As a result, the parts to which the target DNA is fixed is fluorescent-colored. By measuring the position and coloring intensity of the fluorescent-colored parts on the chip, the types and amounts of the target DNA can be detected.

In order to make a DNA chip used in this manner, it is necessary to fix a plurality types of probe DNA each having a predetermined sequence at predetermined positions on a substrate surface.

There are two main methods of fixing probe DNA. A first method is called "micro array method". In this method, probe DNA that has been chemically synthesized or extracted from an intended living organism in advance is fixed in an array on a substrate by dropping or printing.

In a second method, using four bases thymine (T), adenine (A), cytosine (C) and guanine (G), a plurality of types of probe DNA, each being single-chain DNA having a predetermined sequence according to design, are chemically synthesized directly on a substrate.

In the second fixing method, it is required that on a surface of a substrate used for the chemical synthesis, a reaction region where a reaction to synthesize intended probe DNA proceeds and a non-reaction region which is not involved in the synthesis reaction should be formed in a definitely separated manner.

As a DNA chip made by this second fixing method, for example "Gene Chip" (name of an article produced by Affymetrix, Inc.) is known.

In the case of this chip, quartz is used as a material for a substrate, and photolithography is applied to form a reaction region and a non-reaction reaction in a separated manner. Further, when probe DNA is chemically synthesized, single-chain DNA is formed unit by unit by applying ultraviolet rays for activation of single-chain DNA in the reaction region.

In this chip, a reaction region consisting of about 200,000 spots of about 20 μm square each is formed on a single substrate, and about 2,000,000 strands of probe DNA of the same type are fixed in one spot.

In this chip, the spots are formed on the chip at high density. Hence, a very large number of types of target DNA can be detected in one test.

FIG. 2A of PCT Application Published Japanese Translation No. Hei 9-500568 shows an array plate described below.

The array plate is made as follows: First, a surface of an Si substrate is made to react with fluoroalkylsilane to once form a thin film of hydrophobic fluoroalkylsiloxane on it. Then, this thin film is removed in a predetermined two-dimensional pattern so that the surface of the Si substrate will be exposed in the spots having the thin film removed. Last, the exposed surface is made to react with hydroxysilane or alkylsilane so that the exposed surface will have OH group.

Thus, in this array plate, the surface of the Si substrate has sites of a hydrophobic thin film having a large surface tension and sites having hydrophilic OH group. For biological substances, the former function as a non-reaction region, while the latter function as a reaction region.

When this array plate is used, synthesis reaction is made to proceed in the hydrophilic sites, and then a to-be-examined liquid is supplied to these sites. Due to the large surface tension of the hydrophobic thin film around the hydrophilic sites, the to-be-examined liquid is held in the hydrophilic sites.

In this array plate, however, the reaction region and the non-reaction region are formed on the surface of the Si substrate to be virtually flush with each other. Hence it does not have sufficient stability in holding a supplied to-be-examined liquid and hence is not easy to use.

Further, the formation of the reaction region and the formation of the non-reaction region both depend on chemical reaction between the Si surface and other chemicals. The reaction does not always proceed at a yield of 100%. Thus, it is not improbable that the boundary between the reaction region and the non-reaction region is indefinite. Another problem is that the hydrophobic thin film and the hydrophilic sites are easily damaged from the outside.

From the aspect of holding an to-be-examined liquid, a substrate in which bottomed wells having a structure capable of holding a to-be-examined liquid are distributed in a substrate surface is preferable to the array plate having the above structure.

As a substrate of this type, PCT Application Published Japanese Translation No. 2002-537869 discloses a substrate used for direct synthesis of probe DNA and a method of chemical synthesis of probe DNA using it.

A sketch of this substrate is given in FIG. 1.

The substrate 1 is made from an Si wafer. In a surface of the substrate 1, a plurality of micro cuvettes 2 are formed in a predetermined array. The micro cuvettes 2 are sunken holes (bottomed wells) of about 1 to 1000 μm in diameter and about 1 to 500 μm in depth, and function as a reaction region for chemical synthesis of probe DNA. The surface part except for these wells is a non-reaction region.

This substrate A is made as follows:

Step $a_1$: By applying photolithography and etching to a surface $1_a$ of an Si wafer 1, an intermediate $A_1$ as shown in FIG. 2 is formed, in which sunken holes 2A of almost the same shape as that of to-be-formed bottomed wells are formed at positions at which the bottomed wells are to be formed.

Step $a_2$: By performing, for example thermal oxidation treatment onto the surface $1_a$ of the Si wafer and the surfaces of the sunken holes 2A (their bottoms and side surfaces) in the intermediate $A_1$, an intermediate $A_2$ as shown in FIG. 3 is formed, in which only the superficial part of these surfaces has been turned into an Si oxide layer 3 of about 0.5 μm in thickness.

Step $a_3$: Silanization treatment is performed onto the surface of the Si oxide layer 3 of the intermediate $A_2$. Specifically, the surface of the Si oxide layer 3 is treated with alkali by applying Brown Process using NaOH, and then treated with, for example an activated silanizing agent having an epoxysilane type group. Then, linkage of the silanizing agent and hydrolysis of epoxy resin is made to proceed successively. As a result, an intermediate $A_3$ shown in FIG. 4 is obtained, in which a silane layer 4 is formed on the surface of the Si oxide layer 3.

In the intermediate $A_3$, since OH groups of silane are present in its entire surface, the entire surface can react with DNA phosphoramidite.

Step $a_4$: By applying the phosphoramidite method to the surface of the intermediate $A_3$, strands of single-chain DNA of a length corresponding to 5 bases or so are synthesized using DNA phosphoramidite T (thymine). Thus, an intermediate $A_4$ having bottomed wells as shown in FIG. 5 is formed, in which an oligonucleotide (5T) spacer layer 5 is formed on the silane layer 4.

It is to be noted that the terminal of the synthesized oligonucleotide (5T) is blocked with dimethoxytrityl (DMT).

The entire surface of the intermediate $A_4$ is covered with the spacer layer 5 of oligonucleotides (5T) blocked with DMT. Hence, when the terminals of oligonucleotides are activated by eliminating the DMT blocking the terminals (detrirylation), probe DNA can be synthesized there.

Thus, in the case of the intermediate $A_4$, when a DNA chip is to be made, the entire surface formed of the oligonucleotide (5T) spacer layer 5 functions as a reaction region.

However, this does not meet the condition for the substrate for synthesizing probe DNA, namely the condition that the bottomed wells and the other part should be definitely separated as a reaction region and a non-reaction region, respectively.

Hence, treatment needs to be performed on the layer 5 of the intermediate $A_4$ to leave the bottomed wells as they are a reaction region and turn the other part into a non-reaction region. This treatment is capping performed in the next step.

Step $a_5$: As shown in FIG. 6, in the intermediate $A_4$, only the bottomed wells are filled with resin droplets 6. In this state, capping is performed on the layer 5.

Specifically, by performing detritylation on the oligonucleotide (5T) spacer layer 5, the terminals of the oligonucleotides (5T) are activated. Then, using trichloroacetic acid, acetic anhydride, dymethylaminopyridine or the like, the activated terminals of the oligonucleotides (5T) are blocked and inactivated.

Then, using an organic solvent such as tetrahydrofuran, the resin droplets 6 filling the bottomed wells are dissolved and removed so that the layer 5 will be exposed in the bottomed wells.

During this capping, since the bottomed wells are filled with resin, the oligonucleotide (5T) spacer layer 5 in the bottomed wells does not undergo the capping and maintains the state capable of reaction. Meanwhile, the oligonucleotides (5T) in the part except for the bottomed wells undergo the capping and are brought into a state incapable of synthesis reaction.

In this way, a substrate A for synthesis of probe DNA having a cross-sectional structure shown in FIG. 7 is made.

In this substrate A, the bottomed wells 2, which are sunken holes, are formed in the surface of the Si wafer 1 in a predetermined pattern. The Si oxide layer 3 is formed on the Si wafer 1 to cover the entire surface thereof, and the silane layer 4 is formed on the Si oxide layer 3 to cover the entire surface thereof.

On the bottom $2a$ and the side surface $2b$ of each of the bottomed wells 2, the spacer layer 5 of oligonucleotides (5T) with their terminals blocked with DMT is exposed. These spots form a reaction region for synthesizing probe DNA. Meanwhile, the part $5a$ except for these spots of the layer 5 has undergone capping and forms a non-reaction region.

When a DNA chip is made using this substrate A by the phosphoramidite method, chemical synthesis of probe DNA proceeds in the bottomed wells 2.

However, this substrate A has problems mentioned below.

A first problem is that in the substrate A, the boundary between the reaction region and the non-reaction region is determined by how the bottomed wells are filled with resin droplets in step $a_5$.

Generally, filling of the bottomed wells with resin droplets is performed using a piezoinjector. The amount of resin droplets supplied to fill one bottomed well is very minute, specifically in the order of p1 to μ1. Hence, in step $a_5$, sometimes the amount of resin droplets supplied to fill a bottomed well is too much and the resin runs over the bottomed well, and sometimes the amount of resin droplets supplied is too less to completely fill a bottomed well.

In the former case, also a surface of a part surrounding the bottomed well is covered with the resin running over the bottomed well. As a result, in the capping performed next, the surface of this surrounding part does not undergo capping and remains capable of synthesis reaction.

Hence, when a DNA chip is made, probe DNA is chemically synthesized also on the surface of the part surrounding the bottomed well. As a result, when target DNA is examined using the DNA chip made, fluorescent coloring may occur not only in the bottomed well but also in the part surrounding the bottomed well over which the resin ran. This hinders accurate reading of fluorescent marks.

Further, in the case in which the amount of resin droplets supplied is too less to fill a bottomed well, the thickness of the resin covering the inside surface of the bottomed well is thin. Hence, the resin is easily corroded by an acid solution used in capping. As a result, a part of the oligonucleotide (5T) spacer layer located in the bottomed well may undergo capping.

Thus, when a DNA chip is made, probe DNA may not be satisfactorily chemically synthesized in this bottomed well. As a result, when target DNA is examined, fluorescent coloring may not occur with a sufficient coloring intensity in this bottomed well.

Further, if the capping in step $a_5$ is insufficient, it also may cause the problem that when a DNA chip is made and used, fluorescent coloring occurs not only in bottomed wells but also in parts where capping was insufficient. In other words, background noise easily occurs.

Further, when the sunken holes 2A, which will form the bottomed wells, are formed in step $a_1$, the depth of the sunken holes 2A is determined by the length of etching time. Hence, if time management for etching is not performed accurately, the bottomed wells may not be formed to have an accurate depth according to design criteria.

DISCLOSURE OF INVENTION

An object of the invention is to provide a substrate for a biochip which can be made without capping that is an indispensable step (step $a_5$) for making the substrate A described as an example of the substrate for the biochip having bottomed wells, and still in which the boundary between a reaction region and a non-reaction region is definite.

Another object of the invention is to provide a substrate for a biochip in which bottomed wells having an accurate depth according to design criteria can be much more easily formed than in conventional substrates.

In order to achieve the above objects, the invention provides a substrate for a biochip, comprising a substrate surface having a reaction region capable of reacting with biological substances and a non-reaction region not reacting with the biological substances, sunken bottomed wells formed in the substrate surface, and a layer of a material capable of reacting the biological substances having a surface exposed only at the bottoms of the bottomed wells, the exposed surface forming the reaction region.

In particular, the invention provides the substrate for the biochip in which the layer of a material capable of reacting the biological substances is a layer of a silicon (Si) oxide, and in which the surface of the Si oxide layer is silanized.

Yet another aspect of the present invention inheres in a substrate for a biochip according to the embodiment of the present invention having a first layer having a surface to be hydroxylated, and a second layer disposed on the first layer, the second layer having a plurality of wells reaching to the first layer and a plurality of grooves configured to fill the wells with a same solution.

Yet another aspect of the present invention inheres in a method for manufacturing a substrate for a biochip according to the embodiment of the present invention having etching portions of a second layer disposed on a first layer and exhibiting the first layer, and dipping the first layer into a sodium hydrate solution to introduce a plurality of hydroxyl groups on the first layer.

BRIEF DESCRIPTION OF DRAWINGS

FIG. 47 depicts protected bases in accordance with the third embodiment of the present invention;

FIG. 55 depicts deprotected bases in accordance with the third embodiment of the present invention;

BEST MODE FOR CARRYING OUT THE INVENTION

In a substrate for a biochip according to the invention, a reaction region capable of reacting with biological substances and a non-reaction region not reacting with the biological substances are formed on a substrate surface in a definitely separated manner.

Here, the term "biological substances" is used to mean biological molecules or physiologically active substances having a site reacting with or bonding to-be-examined substances. Further, the term "biological substances" is used here to include substances that have an affinity with the biological substances in the above sense. The biological substances are not limited to specific ones. For example, substances having a site bonding to nucleic acids such as oligonucleotide, polynucleotide, deoxyribonucleic acid (DNA) and ribonucleic acid (RNA); substances having a physiologically or pharmacologically active site such as enzymes, vitamins, peptides, proteins, hormones, endocrine disturbing chemicals, sugars and lipids; complexes of RNA and a protein and complexes of a protein such as lectin and a sugar can be mentioned.

By fixing biological substances that react with to-be-examined biological substances in a specific manner in a reaction region of the substrate for the biochip according to the invention, different types of chips can be made.

Using a substrate for synthesizing probe DNA as an example, the substrate for the biochip according to the invention will be described below.

First Embodiment

Figure 1:
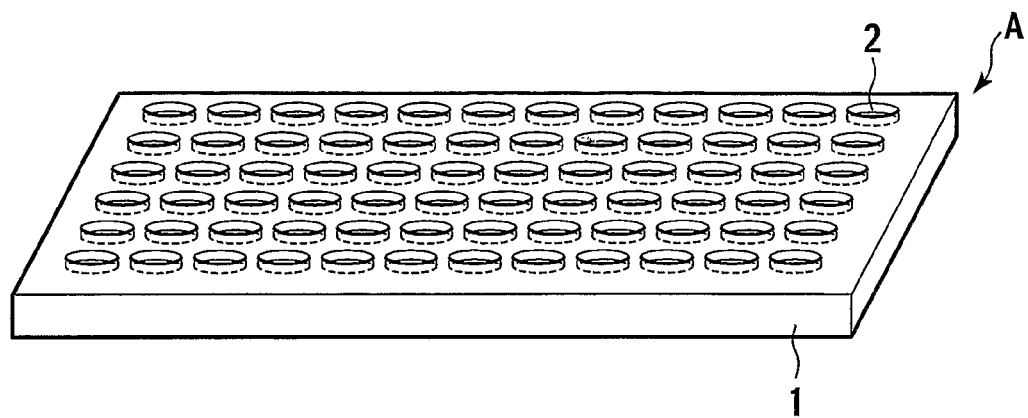
FIG. 1 is a perspective view showing an example of a substrate for synthesizing probe DNA.
Figure 2:
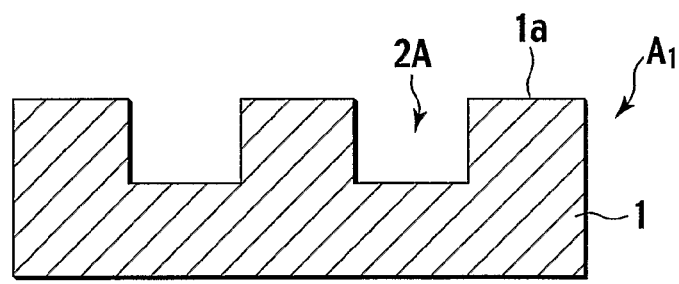
FIG. 2 is a cross-sectional view showing an intermediate $A_1$ in the formation of a conventional substrate A for synthesizing probe DNA.
Figure 3:
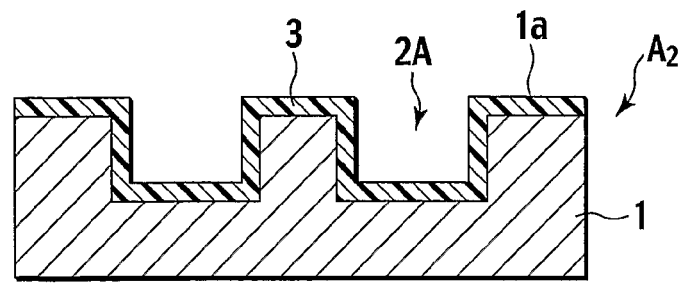
FIG. 3 is a cross-sectional view showing an intermediate $A_2$ in the formation of the substrate A.
Figure 4:
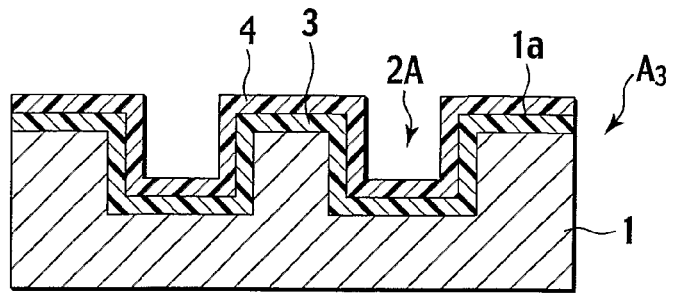
FIG. 4 is a cross-sectional view showing an intermediate $A_3$ in the formation of the substrate A.
Figure 5:
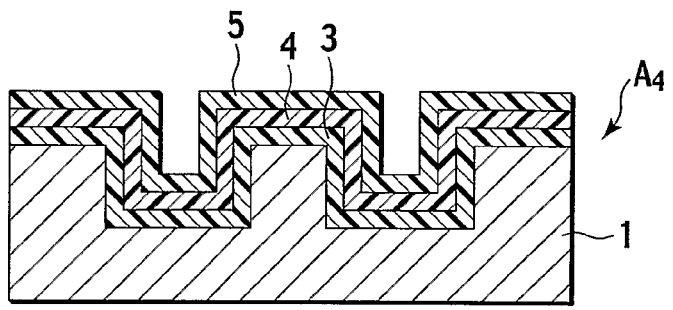
FIG. 5 is a cross-sectional view showing an intermediate $A_4$ in the formation of the substrate A.
Figure 6:
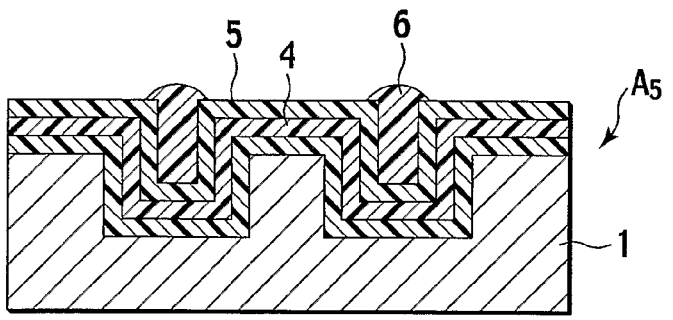
FIG. 6 is a cross-sectional view showing an intermediate $A_5$ in the formation of the substrate A.
Figure 7:
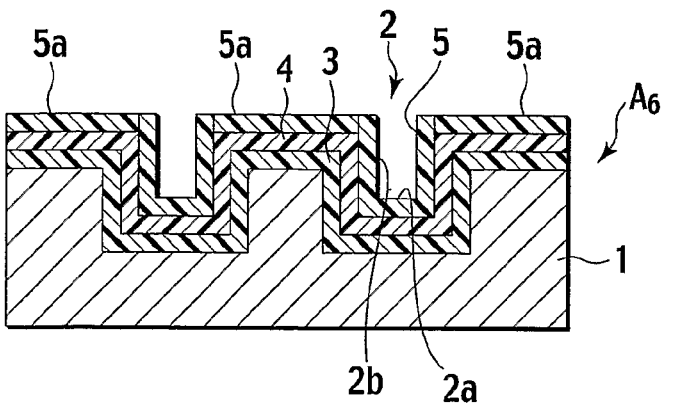
FIG. 7 is a cross-sectional view showing an example A of a conventional substrate for synthesizing probe DNA.

The substrate according to a first embodiment of the present invention is similar to the above-described substrate A of FIG. 7 in that a surface of the substrate comprises a reaction region where reaction in which probe DNA is formed using DNA phosphoramidite can proceed and a non-reaction region where this reaction does not proceed.

However, in the substrate A, the non-reaction region is formed by capping. Meanwhile, in the substrate according to the first embodiment of the present invention, the reaction region is formed of a reactive material while the other region is surely formed of a material inactive in the reaction. Thus, the most important feature of the substrate according to the first embodiment of the present invention is that the reaction region and the non-reaction region are formed in a definitely separated manner without performing surface inactivation treatment such as capping.

Figure 8:
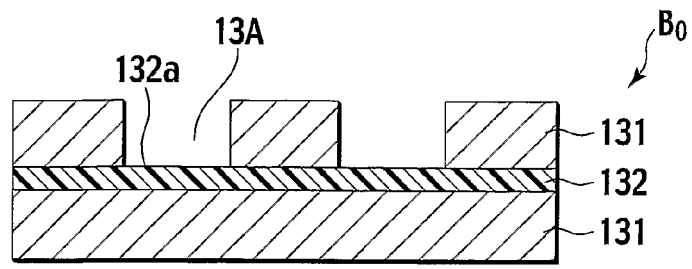
FIG. 8 is a cross-sectional view showing an example $B_0$ of substrate structure for a substrate according to a first embodiment of the present invention.

First, an example $B_0$ of the basic structure for the substrate according to the first embodiment of the present invention is shown in FIG. 8.

The substrate $B_0$ is a plate-like piece having a sandwich structure comprising two Si layers 131, 131 and an Si oxide layer 132 provided between them, where holes 13A reaching to the surface 132a of the Si oxide layer 132 are formed in one of the Si layers 131 in a predetermined array pattern to function as bottomed wells.

Thus, in the substrate $B_0$, the surface 132a of the Si oxide layer 132 is exposed only at the bottoms of the holes 13A, and the other surface of the substrate $B_0$ is in Si. Only the surface of the Si oxide layer 132 functions as a reaction region for synthesizing, for example single-chain DNA, while all the other surface of the substrate $B_0$ functions as a non-reaction region.

Figure 9:
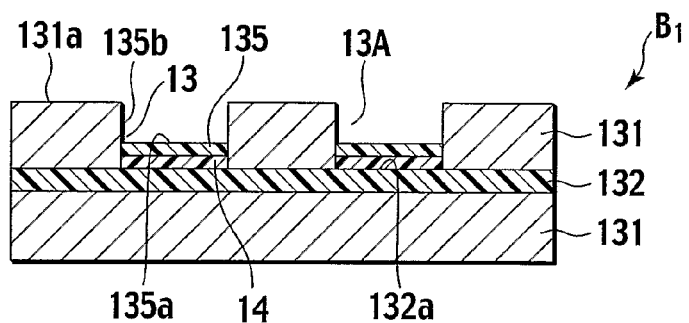
FIG. 9 is a cross-sectional view showing an example $B_1$ of a substrate for synthesizing prove DNA according to the first embodiment of the present invention.

FIG. 9 shows another example $B_1$ of a substrate, which is made using the above-described substrate $B_0$.

In this substrate $B_1$, a silane layer 14 is formed only at the bottoms of the holes 13A in the substrate $B_0$. On the silane layer 14 is formed a spacer layer 135 of oligonucleotides (5T) each formed by synthesizing 5 units of DNA phosphoramidite T successively. As a result, the holes 13A function as bottomed wells 13.

In this substrate $B_1$, the oligonucleotide (5T) spacer layer 135 which enables synthesis of probe DNA is exposed only at the bottoms 135a of the bottomed wells 13, while the side surfaces 135b of the bottomed wells 13 and the surface 131a of the Si layer 131 remain in Si.

Hence, in the substrate $B_1$, only the bottoms of the bottomed wells 13 function as a reaction region for synthesizing probe DNA, while the other part including the side surfaces of the bottomed wells 13 and the substrate surface is a non-reaction region in the chemical synthesis of probe DNA, as it is, namely without undergoing surface inactivation treatment such as capping.

It is to be noted that the silane layer 14 in the substrate $B_1$ is provided so that the oligonucleotide (5T) spacer layer 135 can be synthesized efficiently, and is not indispensable, because the oligonucleotide (5T) spacer layer 135 can be synthesized directly on the surface 132a of the Si oxide layer 132.

Figure 10:
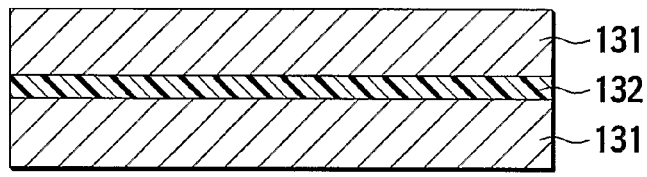
FIG. 10 is a cross-sectional view showing a starting material used for forming the substrate $B_1$.

The substrate $B_1$ can be made as follows:

First, as shown in FIG. 10, a plate-like piece of a structure in which an Si oxide layer 132 is sandwiched between two Si layers 131, 131 is prepared. It is to be noted that one of the Si layers 131 should have a thickness almost equal to the depth of to-be-formed bottomed wells.

As the plate-like piece of this type, an SOI (Silicon on Insulator) wafer commercially available from Shin-Etsu Chemical Co., Ltd. is suitable.

Figure 11:
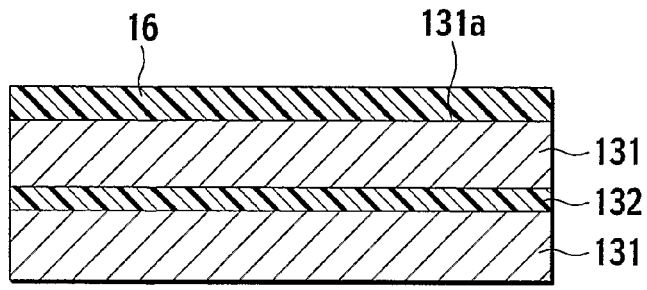
FIG. 11 is a cross-sectional view showing the material of FIG. 10 with a resist formed on, a surface thereof.

Next, as shown in FIG. 11, the entire surface 131a of one of the Si layers 131 is covered with a resist 16, a mask having openings of the same diameter as that of the to-be-formed bottomed wells is placed on the resist, and ultraviolet rays are applied. Then, the mask is removed and the whole is developed.

Figure 12:
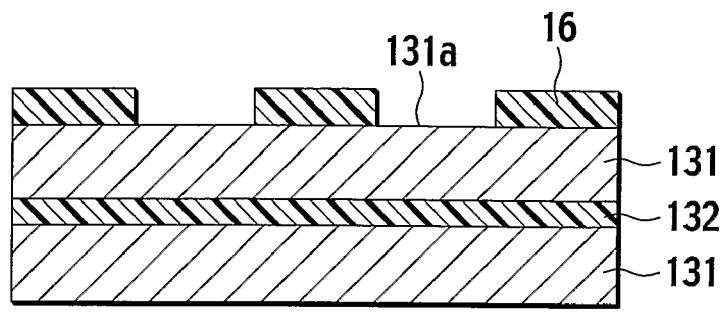
FIG. 12 is a cross-sectional view showing the material of FIG. 11 in which openings are formed in the resist.

As a result, as shown in FIG. 12, openings of the same diameter as that of the to-be-formed bottomed wells are formed in the resist 16, and the surface 131a of the Si layer 131 is exposed in these openings.

Then, using the resist 16 as a mask, etching is performed on the Si layer 131 using an Si etchant to form holes 13A reaching to the surface 132a of the Si oxide layer 132.

The etching automatically stops at the time the removal of the Si layer reaches to the surface 132a of the Si oxide layer 132.

Figure 13:
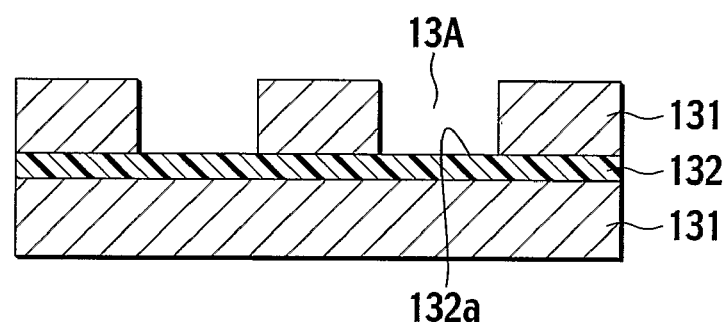
FIG. 13 is a cross-sectional view showing the material in which holes for wells are formed to have a surface of an Si oxide layer exposed.

As a result, as shown in FIG. 13, the piece in which the surface 132a of the Si oxide layer 132 is exposed only at the bottoms of the holes 13A and the other surface part is made of Si is obtained. It is to be noted that the holes 13A in this piece have almost the same diameter and depth as those of the to-be-formed bottomed wells.

Figure 14:
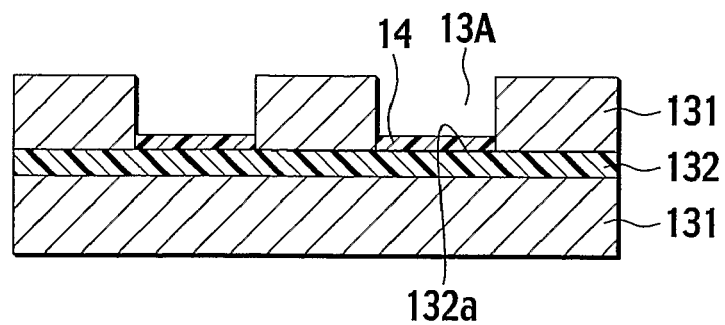
FIG. 14 is a cross-sectional view showing the material in which an silane layer is formed on the surface of the Si oxide layer.

Then, silanization treatment is performed. The silanization reaction proceeds on the surface of the Si oxide layer, so that a silane layer 14 is formed only at the bottoms 132a of the holes 13A (FIG. 14).

Last, by applying the phosphoramidite method, the silan layer 14 is made to react with DNA phosphoramidite T to form a spacer layer 135 of oligonucleotides (5T) each being a strand of sing-chain DNA of 5 mer T. Thus, the substrate $B_1$ shown in FIG. 9 is obtained.

In this process, DNA phosphoramidite forms covalent bonding only with OH-group in the silance layer. Hence, the synthesis reaction proceeds only at the bottoms 132a of the bottomed wells. Meanwhile, since DNA phosphoramidite T does not react with the part where Si is exposed, this part remains a non-reaction region although capping is not performed, unlike the case with the substrate A.

The comparison between the process of making the substrate $B_1$ ($B_0$) and the process of making the conventional substrate A reveals the following:

First, in the case of the substrate A, in step $a_2$, it is necessary to perform thermal oxidation treatment on the surface of the Si wafer to form an Si oxide layer. Meanwhile, the substrate $B_1$ ($B_0$) according to the first embodiment of the present invention does not require step $a_2$.

Further, in the case of the substrate A, in step $a_5$, a series of operations, namely filling the bottomed wells with resin droplets, capping, and dissolution and removal of the resin are indispensable. Meanwhile, the substrate $B_1$ according to the first embodiment of the present invention does not require these operations at all.

Hence, in the case of the substrate $B_1$ ($B_0$), the problems caused by supplying the bottomed wells with too much or too less an amount of resin droplets are obviated, and the boundary between the reaction region and the non-reaction region is definite. Further, the reaction region consists only of the bottoms of the holes 13A formed by applying photolithography and etching, and the other surface part forms the non-reaction region. Thus, when a DNA chip made using this substrate is used, it allows high-accuracy reading of fluorescent marks and prevents background noise.

Further, in the case of the substrate A, in order to form the bottomed wells to have a depth according to design criteria, it is necessary to accurately manage etching time for etching in step $a_1$. Meanwhile, in the case of the substrate $B_1$ ($B_0$) etching which removes parts of the Si layer 131 automatically stops at the time the removal reaches to the surface of the Si oxide layer. The depth of the holes formed is determined uniquely by the thickness of the Si layer 131 used. Hence, the bottomed wells formed have a very accurate depth.

Figure 15:
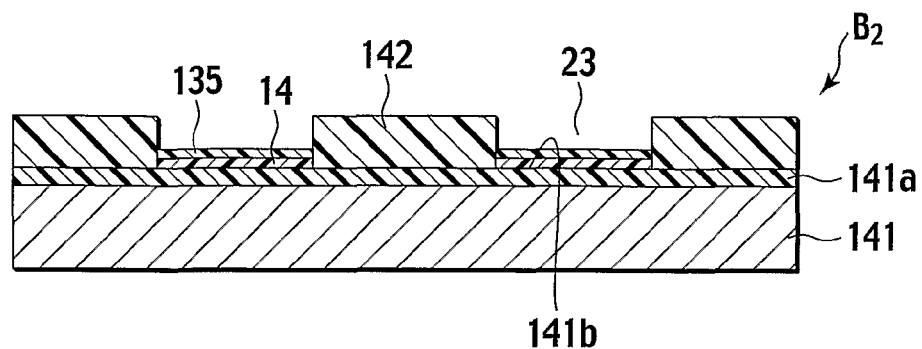
FIG. 15 is a cross-sectional view showing another substrate $B_2$ according to the first embodiment of the present invention.

Another example $B_2$ of a substrate is shown in FIG. 15.

In the substrate $B_2$, on one side of an Si plate 141, only a superficial part is turned into an Si oxide layer 141a, for example by thermal oxidation. On this Si oxide layer 141a is formed a layer 142 of a material which does not react with biological substances such as DNA phosphoramidite T and is not corroded by organic solvents, acid solutions, alkali solutions or the like used in synthesis of DNA, in a predetermined thickness. Across the thickness of this layer 142, holes 23 of a predetermined diameter are formed up to the surface 141b of the Si oxide layer 141a, in a predetermined array pattern.

On the surface 141b of the Si oxide layer 141a, a silane layer 14 and a spacer layer 135 of oligonucleotides (5T), each being a strand of 5 mer single-chain DNA formed from reaction between the silane layer 14 and DNA phosphoramidite T, are formed in this order.

In the case of the substrate $B_2$, the surface of the oligonucleotide (5T) spacer layer 135 capable of reacting with DNA phosphoramidite T is exposed only at the bottoms of the holes 23 to form a reaction region. All the other surface part is a non-reaction region made of a material not reacting with DNA phosphoramidite T, although it does not undergo inactivation treatment.

Here, as a material for the layer 142 which forms a non-reaction region, for example single-crystal silicon, metals not easily forming an oxide such as platinum, nitrides such as silicon nitride, plastics not having a reactive functional group such as polyethylene and polystyrene can be mentioned. The layer 142 can be formed by a film formation method such as direct joint of the material as mentioned above to the Si oxide layer, vacuum deposition or CVD of the material as mentioned above onto the Si oxide layer surface, vapor phase polymerization of a monomer. The holes 23 can be formed by application of photolithography and etching, for example.

Figure 16:
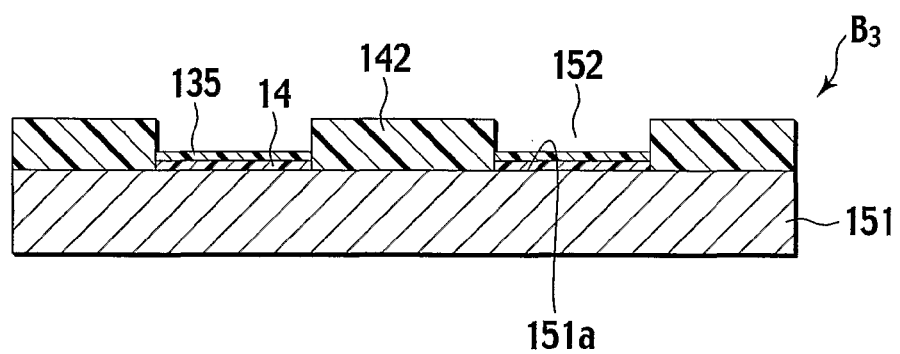
FIG. 16 is a cross-sectional view showing another substrate $B_3$ according to the first embodiment of the present invention.

Another example $B_3$ of a substrate is shown in FIG. 16.

In the substrate $B_3$, the same layer 142 as that of the substrate $B_2$ is formed on a surface of a glass plate 151. Across the thickness of this layer 142, holes 152 reaching to the surface $151_a$ of the glass plate 151 are formed as bottomed wells, and only on the surface $151_a$ of the glass plate exposed at the bottoms of the holes 152, a silane layer 14 and an oligonucleotide (5T) spacer layer 135 are formed.

In the case of the substrate $B_3$, the surface of the oligonucleotide (5T) spacer layer is exposed only at the bottoms $151_a$ of the holes 152 to form a reaction region. The side surfaces of the bottomed wells and the surface of the layer 142 form a non-reaction region although they do not undergo inactivation treatment.

Figure 17:
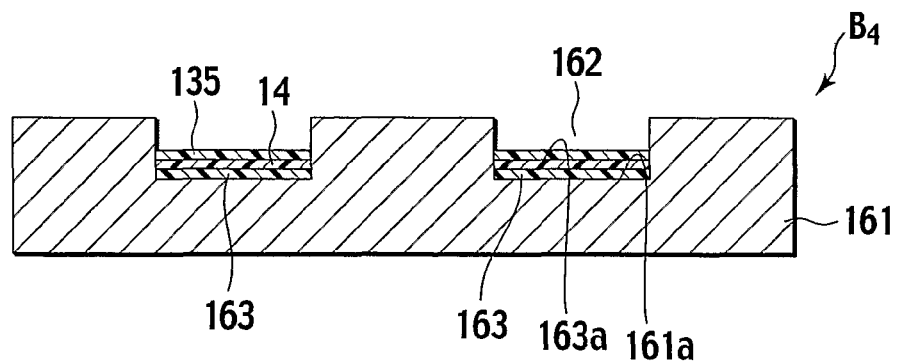
FIG. 17 is a cross-sectional view showing another substrate $B_4$ according to the first embodiment of the present invention.

Another example $B_4$ of a substrate is shown in FIG. 17.

In the substrate $B_4$, holes of a predetermined diameter and depth are formed in a surface $161_a$ of a plate-like piece 161 made of a similar kind of material which does not react with DNA phosphoramidite T and is not corroded by organic solvents, acid solutions, alkali solutions or the like used in synthesis of DNA. These holes are made into bottomed wells by forming an Si oxide layer 163 at the bottoms $162_a$ of the holes, and then forming a silane layer 14 and an oligonucleotide (5T) spacer on the Si oxide layer 163 in this order.

Also in the case of the substrate $B_4$, the oligonucleotide (5T) spacer layer located 135 at the bottoms of the bottomed wells is only the part that can react with DNA phosphoramidite T, while the other part is a non-reaction region.

As the material forming the non-reaction region, Si and nitrides such as silicon nitride can be mentioned, for example.

When a plate-like piece of Si is used, the above-mentioned bottomed wells can be formed by applying dry etching such as reactive ion etching or ion milling, or wet etching, for example.

The bottomed wells may be formed as follows: By applying the SIMOX (Separation by Implanted Oxygen) method to put in oxygen ions from a surface of the Si plate, an Si oxide layer is formed at a certain depth from the surface of the Si plate. Then, by forming holes from the surface of the Si plate up to the Si oxide layer, the bottomed wells are obtained.

Alternatively, the bottomed wells may be formed as follows: A surface of the Si plate is once oxidized. Then by applying photolithography and etching to the resulting Si oxide surface layer, openings are formed in a predetermined array pattern. Then, oxygen ions are put in from the surface of Si exposed in the openings by the above-mentioned SIMOX method, and then the Si oxide surface layer is removed by etching. As a result, the structure in which an Si oxide layer extending only just under the places that were the openings is formed at a certain depth from the surface of the Si plate is obtained. Then, by forming holes from the surface of the Si plate up to the Si oxide layer in the places that were the openings, the bottomed wells are obtained.

Next, the process of making a biochip using the substrate for the biochip according to the first embodiment of the present invention will be described using an example in which a DNA chip having probe DNA fixed by the phosphoramidite method is made using the substrate $B_1$ shown in FIG. 9.

Figure 18:
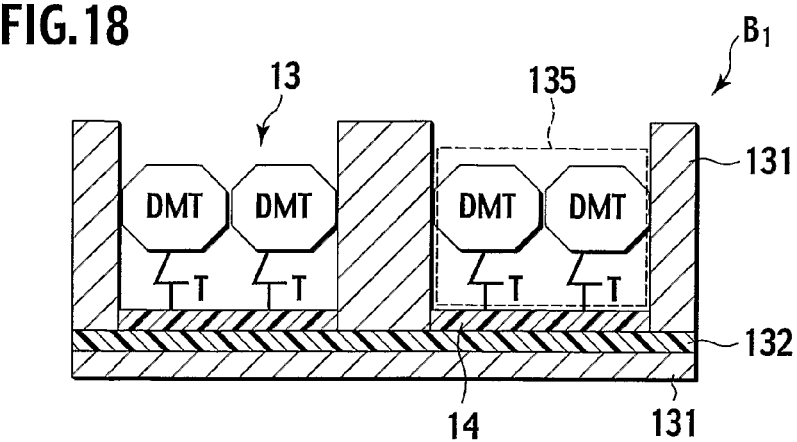
FIG. 18 is an explanatory cross-sectional diagram showing a structure of the substrate $B_1$.

First, the substrate $B_1$ is prepared. As shown in a simplified manner in FIG. 18, in each of the bottomed wells 13 that are arranged in an array in the substrate $B_1$, oligonucleotides (T5) space layer 135 having their terminals blocked with DMT are fixed only at the bottom of the bottomed well.

Step $b_1$: Resin masking is performed for the bottomed wells. Specifically, of the bottomed wells arranged, all the bottomed wells except for those which should undergo chemical reaction with DNA phosphoramidite C (cytosine), for example are filled with resin droplets 6.

Figure 19:
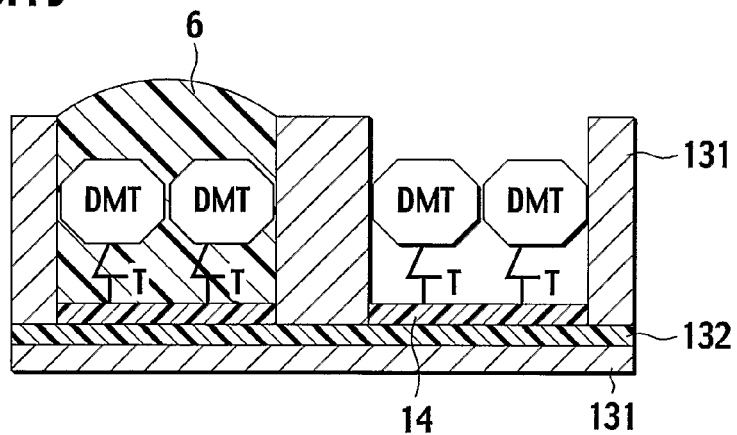
FIG. 19 is an explanatory cross-sectional diagram showing the substrate $B_1$, where a well is filled with resin droplet to mask oligonucleotides (5T) space layer.

As shown in FIG. 19, the oligonucleotides (5T) space layer in the bottomed well filled with resin droplet 6 are blocked by the resin, while the oligonucleotides (5T) space layer in the bottomed well not filled with resin droplet 6 are in a state that DMT at their terminals can be eliminated.

Step $b_2$: Detritilation is performed by supplying a solution of an acid such as trichloroacetic acid evenly to the entire upper surface of the substrate.

Figure 20:
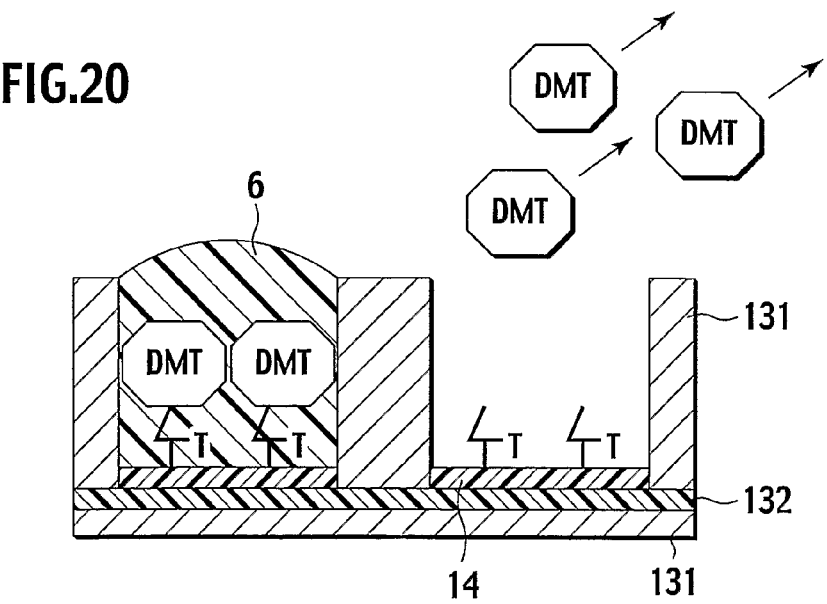
FIG. 20 is an explanatory cross-sectional diagram showing the substrate $B_1$, where DMT has been eliminated from the terminals of oligonucleotides (5T) space layer in an open bottomed well.

As a result, as shown in FIG. 20, in the bottomed wells not filled with resin droplets 6, DMT is eliminated from the oligonucleotides (5T) space layer, so that those oligonucleotides (5T) space layer are activated.

Thus, of the bottomed wells arranged in the surface of the substrate $B_1$, only the specific wells (wells not filled with resin droplets) are in a state capable of reacting with DNA phosphoramidite.

Step $b_3$: By supplying an organic solvent to the substrate surface, the resin droplet filling the bottomed wells is dissolved and removed.

Figure 21:
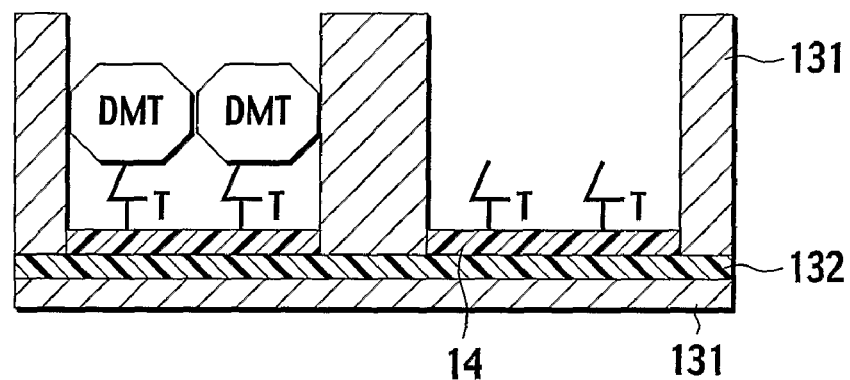
FIG. 21 is an explanatory cross-sectional diagram showing the substrate $B_1$, where the resin that had filled the bottomed well has been dissolved and removed.

As a result, as shown in FIG. 21, at the bottoms of the bottomed wells arranged in the substrate, the activated oligonucleotides (5T) space layer and the oligonucleotides (5T) space layer having their terminals blocked with DMT are exposed.

Step $b_4$: DNA coupling is performed by supplying a reagent containing DNA phosphoramidites C with their terminals blocked with DMT evenly to the entire surface of the substrate.

Figure 22:
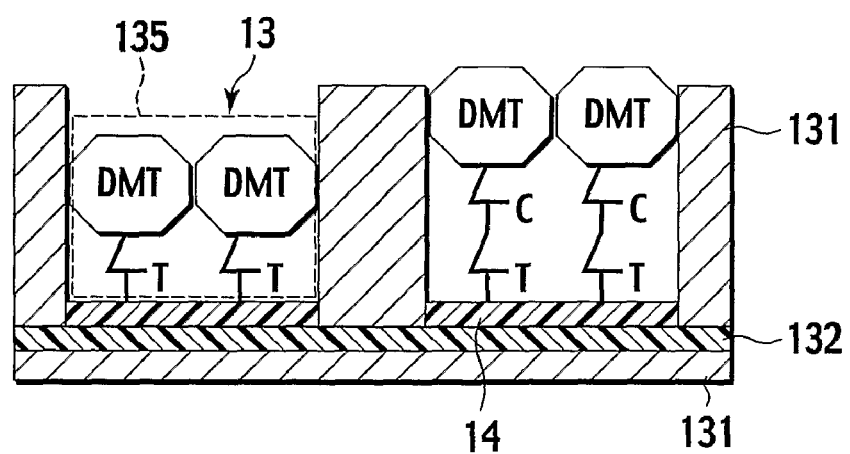
FIG. 22 is an explanatory cross-sectional diagram showing the substrate $B_1$, where DNA phosphoramidites (C) is chemically bonded to the oligonucleotides (5T) from which DMT has been eliminated.

As a result, as shown in FIG. 22, in the specific bottomed wells, synthesis reaction between the activated oligonucleotides (5T) space layer and the supplied DNA phosphoramidites C proceed, so that they are chemically combined together. Thus, the oligonucleotides grow by 1 mer, and the terminals of the grown oligonucleotides are blocked with DMT.

Meanwhile, in the other bottomed wells, the exposed oligonucleotides (5T) space layer have their terminals blocked with DMT and therefore are inactive. Hence, they do not react with the supplied DNA phosphoramidites C.

By performing this DNA synthesis reaction where steps $b_1$ to $b_4$ form one cycle, only in the bottomed wells not filled with resin droplets, the oligonucleotides grow by 1 mer in one cycle. Meanwhile, the bottomed wells filled with resin remains as they were before the synthesis reaction started.

There are four types of DNA phosphoramidite T, A, C and G to react with the oligonucleotides. Hence, by performing the above cycle four times, the oligonucleotides fixed in the bottomed wells can be grown by 1 mer.

In this way, probe DNA having sequences according to a design can be fixed only at the bottoms of the bottomed wells in the substrate $B_1$.

When a DNA chip is made using this substrate $B_1$, DNA synthesis reaction proceeds only at the bottoms of the bottomed wells. The other part is not involved in the synthesis reaction at all. Hence, for example even if in step $b_1$, resin droplet to fill a bottomed well runs over the bottomed well, it does not affect the DNA synthesis reaction at all unless the resin flows into adjacent bottomed wells, and therefore has no adverse effects on reading of fluorescent marks at all. Further, inactivation treatment (capping) which is performed in the case of the substrate A does not need to be performed any longer.

In the above description, all the substrates $B_1$, $B_2$, $B_3$ and $B_4$ are substrates for DNA chips in which the formation of the silane layer on the surface of the Si oxide layer of the substrate $B_0$ enables probe DNA synthesis reaction.

However, the substrate for the biochip according to the first embodiment of the present invention is not limited to this type. By selecting, as a material for forming the bottoms of the bottomed wells (reaction region), a material capable of fixing biological substances that bond to to-be-examined biological substances in a specific manner, different types of chips can be made.

For example, if a linker substance that bonds to a to-be-examined biological substance in a specific manner is fixed on the surface of the Si oxide layer of the substrate $B_0$ having the basic structure shown in FIG. 8, the part to which the linker substance is fixed can function as a reaction region specialized for reaction with that biological substance. In this case, the other part of the substrate forms a non-reaction region for that biological substance, and both regions are separated by a definite boundary.

For example when a silane coupling agent such as aminopropylemethoxysilane, or a substance having a functional group such as an epoxy group, an tosyl group, an activated carboxyl group, an amino group, a thiol group or a bromoatoamido group is used as the linker substance, a biological substance having an amino group, a thiol group, a hydroxyl group, carboxyl group, a bromoatomamido group or the like at its terminal can be fixed on the surface of the Si oxide layer of the substrate $B_0$ by using the linker substance.

Further, by using double-chain DNA, proteins, peptides, sugars, RNA-protein complexes, or sugar-protein complexes as the biological substances, chips for detecting transcription factors that identify a specific base sequence of double-chain DNA and bond to it, a chip for detecting peptides, a chip for detecting proteins, a chip for detecting sugars, a chip for digesting proteins or the like can be made.

Second Embodiment

Using an SOI wefer (produced by Shin-Etsu Chemical Co., Ltd.) as a starting material, a substrate $B_1$ having a final structure shown in FIG. 9 was made by the process shown in FIGS. 10 to 14.

The specifications of the substrate $B_1$ were as follows:

Size: 1 cm×1 cm; Shape of bottomed wells: 300 μm in diameter and 20 μm in depth; The bottomed wells were arranged in a grid pattern in the substrate, where 9 wells were in one line and 14 wells were in one row.

The silane layer was formed using 5,6-epoxytriethoxysilane, and the oligonucleotide spacer layer was formed by the phosphoramidite method using a DNA synthesizing reagent produced by Proligo Japan K. K.

Using this substrate $B_1$ and applying the phosphoramidite method, a DNA chip was made, where probe DNA having the sequences below was synthesized in the wells.

| | |
|---|---|
| 1. | 3'-ATCTCACACGTCAAATAG-5' |
| 2. | 3'-ATCTCACTCAAATAG-5' |
| 3. | 3'-ATCTCACGCAAATAG-5' |
| 4. | 3'-ATCTCACCCAAATAG-5' |
| 5. | 3'-ATCTCACACAAATAG-5' |
| 6. | 3'-ATCTCACCAAATAG-5' |

Figure 23:
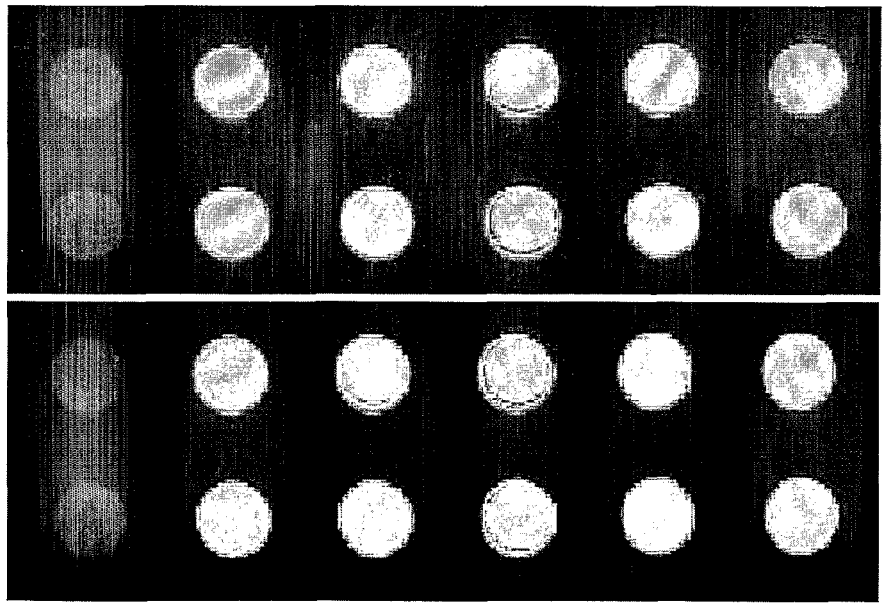
FIG. 23 is a photograph showing results of examination about target DNA using a DNA chip made using the substrate $B_1$ according to the first embodiment of the present invention.

Using this DNA chip, fluorescence-marked target DNA detection test was performed. FIG. 23 is a photograph showing the results.

As seen in FIG. 23, spots corresponding to probe 4 were highest in fluorescence intensity. From this, it turned out that the sequence of the target DNA was 5'-TAGAGTGGGTT-TATC-3'.

In each of probes 2, 3 and 4, a base located at the center of the sequence causes a mismatch. In probe 1, the base sequence is too long and causes a mismatch, while in probe 6, the base sequence is too short and causes a mismatch.

For comparison, a substrate A having a structure shown in FIG. 7 was made by performing capping according to the method disclosed in PCT Application Published Japanese Translation No. 2002-537869.

Using this substrate A, a DNA chip in which probe DNA having the above-mentioned 6 sequences was fixed was made in the same manner as in the Example.

Figure 24:
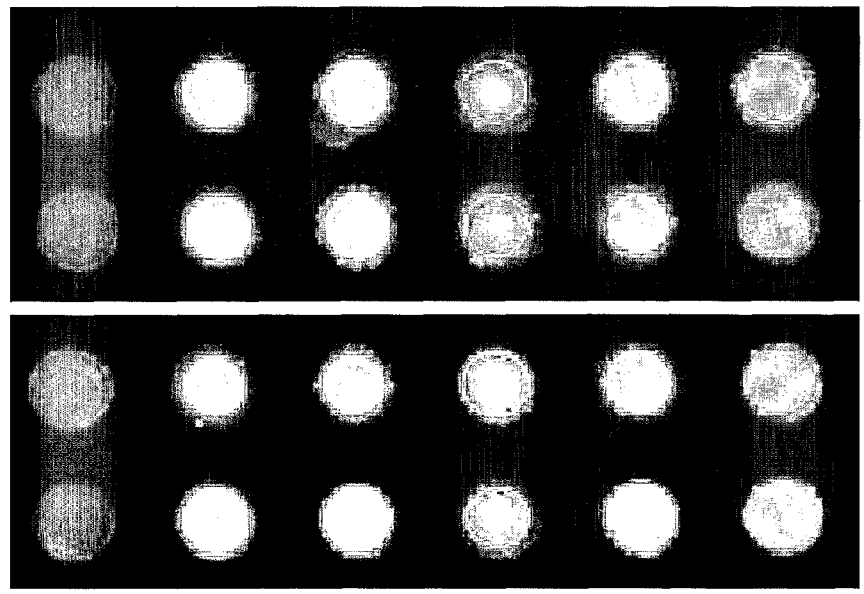
FIG. 24 is a photograph showing results of examination about target DNA using a DNA chip made using the conventional substrate A.

Target DNA detection test was performed in the same manner as in the Example. FIG. 24 shows the results.

Also in this DNA chip, spots corresponding to probe 4 were highest in fluorescence intensity. Hence, also from this DNA chip, it turned out that the sequence of the target DNA was 5'-TAGAGTGGGTTTATC-3'.

It is to be noted that as seen in FIG. 24, in the DNA chip made from the substrate A, the part surrounding each spot was fluorescent-colored, that is, background noise was produced, which made the boundary between the fluorescent-colored spots and the substrate surface unclear.

This comes from the fact that when the wells were filled with resin droplets in the process of making the substrate, the resin ran over the wells to their surrounding parts, so that these surrounding parts did not undergo capping.

In the spots corresponding to probe 4, a central part of each spot was week in fluorescent color. This comes from the fact that too less an amount of resin droplets was supplied to fill the wells. Meanwhile, each spot as a whole was high in fluorescence intensity. This is because the probe DNA fixed in these spots was complementary to the target DNA.

Compared with the substrate A, in the case of the substrate B that is an example of a second embodiment of the present invention, the boundary between the fluorescent-colored spots and the substrate surface was very clear and background noise was virtually not produced.

Further, each fluorescent-colored spot showed an even fluorescence intensity, and measured data was stable.

Third Embodiment

Figure 25:
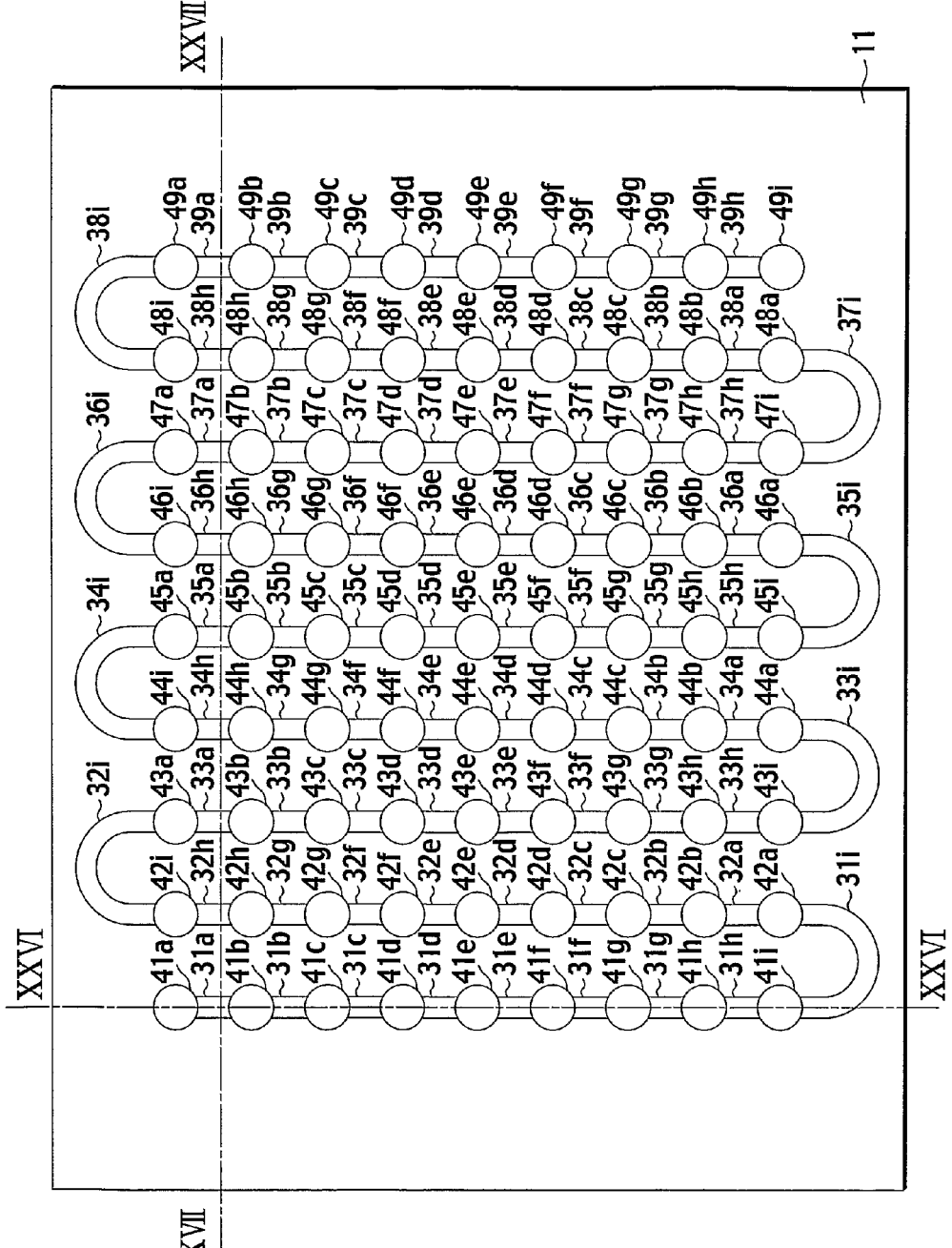
FIG. 25 is a plane view of a substrate for a biochip in accordance with a third embodiment of the present invention.
Figure 26:
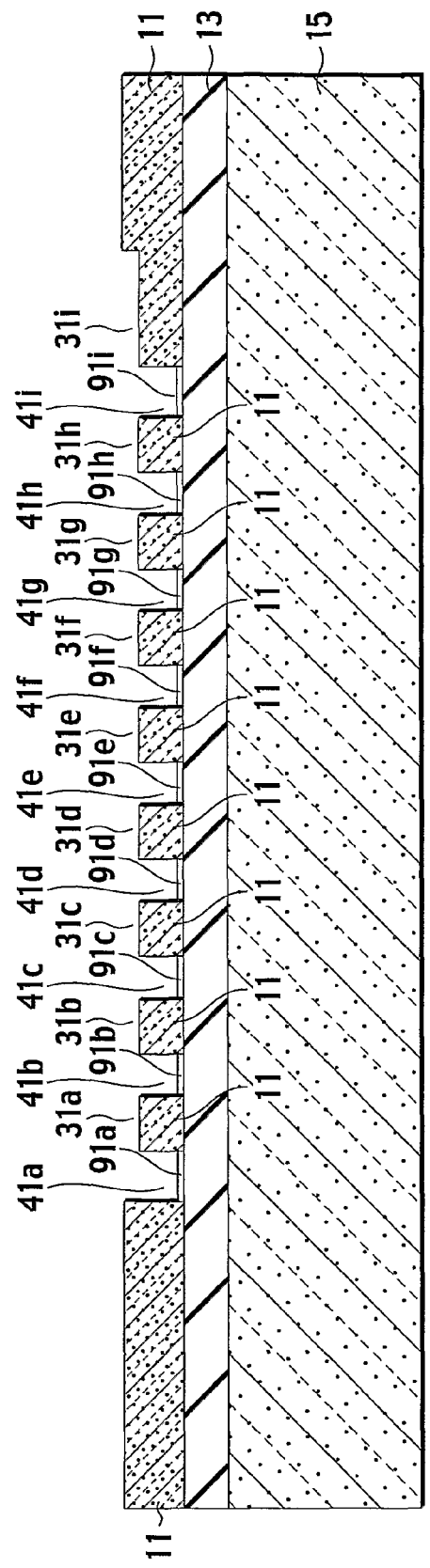
FIG. 26 is a first sectional view taken along line XXVI-XXVI in FIG. 25, showing the substrate for the biochip in accordance with the third embodiment of the present invention.

With reference to FIGS. 25 and 26, a substrate for a biochip according to a third embodiment of the present invention has a semiconductor substrate 15, a first layer 13 having a surface to be hydroxylated and disposed on the semiconductor substrate 15, and a second layer 11 disposed on the first layer 13. The second layer 11 has a plurality of wells 41a, 41b, 41c, 41d, 41e, 41f, 41g, 41h, 41i, 42a, 42b, 42c, 42d, 42e, 42f, 42g, 42h, 42i, 43a, 43b, 43c, 43d, 43e, 43f, 43g, 43h, 43i, 44a, 44b, 44c, 44d, 44e, 44f, 44g, 44h, 44i, 45a, 45b, 45c, 45d, 45e, 45f, 45g, 45h, 45i, 46a, 46b, 46c, 46d, 46e, 46f, 46g, 46h, 46i, 47a, 47b, 47c, 47d, 47e, 47f, 47g, 47h, 47i, 48a, 48b, 48c, 48d, 48e, 48f, 48g, 48h, 48i, 49a, 49b, 49c, 49d, 49e, 49f, 49g, 49h, 49i. Each of the wells 41a-49i reaches to the first layer 13.

Further, the second layer 11 shown in FIG. 25 has a plurality of grooves 31a, 31b, 31c, 31d, 31e, 31f, 31g, 31h, 31i, 32a, 32b, 32c, 32d, 32e, 32f, 32g, 32h, 32i, 33a, 33b, 33c, 33d, 33e, 33f, 33g, 33h, 33i, 34a, 34b, 34c, 34d, 34e, 34f, 34g, 34h, 34i, 35a, 35b, 35c, 35d, 35e, 35f, 35g, 35h, 35i, 36a, 36b, 36c, 36d, 36e, 36f, 36g, 36h, 36i, 37a, 37b, 37c, 37d, 37e, 37f, 37g, 37h, 37i, 38a, 38b, 38c, 38d, 38e, 38f, 38g, 38h, 38i, 39a, 39b, 39c, 39d, 39e, 39f, 39g, 39h delineated in the second layer 11. Each of the grooves 31a-39h connects the wells 41a-41i, 42a-42i, 43a-43i, 44a-44i, 45a-45i, 46a-46i, 47a-47i, 48a-48i, 49a-49i to fill the wells 41a-49i with a same solution.

The first layer 13 composed of silicon dioxide ($SiO_2$). The second layer 11 is composed of material different from the first layer 13. For example, the second layer 11 is composed of crystal silicon. The first layer 13 has higher hydrophilicity than the second layer 11. Therefore, the first layer 13 is easily hydroxylated in comparison with the second layer 11.

Figure 27:
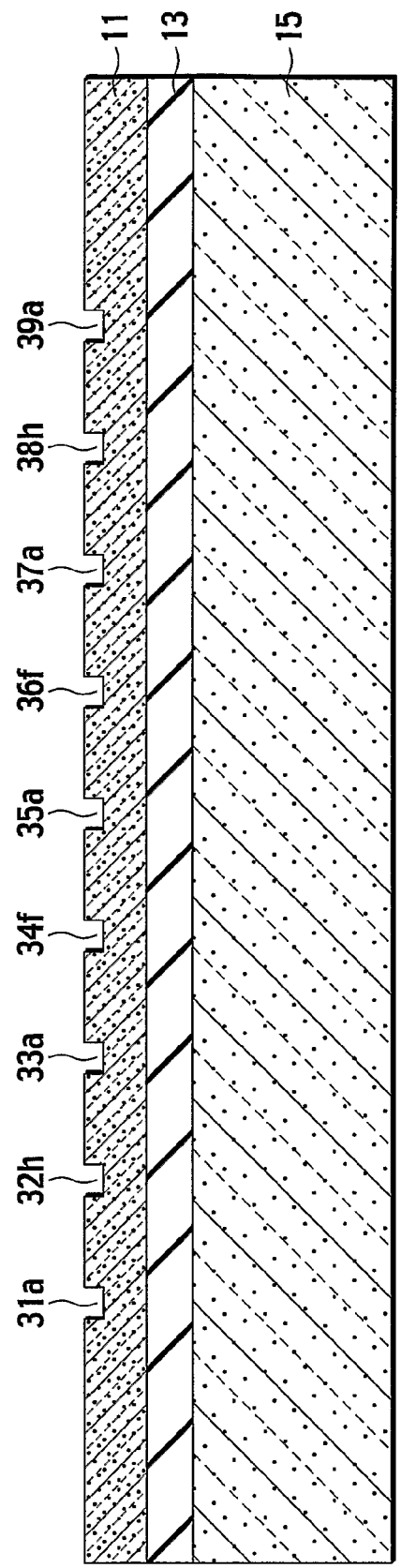
FIG. 27 is a sectional view taken along line XXVII-XXVII in FIG. 25, showing the substrate for the biochip in accordance with the third embodiment of the present invention.

With reference to FIGS. 26 and 27, the groove 31a connects the well 41a and the well 41b. Similarly, each of the other grooves 31b-31i, 32a-32i, 33a-33i, 34a-34i, 35a-35i, 36a-36i, 37a-37i, 38a-38i, 39a-39h connects the wells 41b-41i, 42a-42i, 43a-43i, 44a-44i, 45a-45i, 46a-46i, 47a-47i, 48a-48i, 49a-49i.

Figure 28:
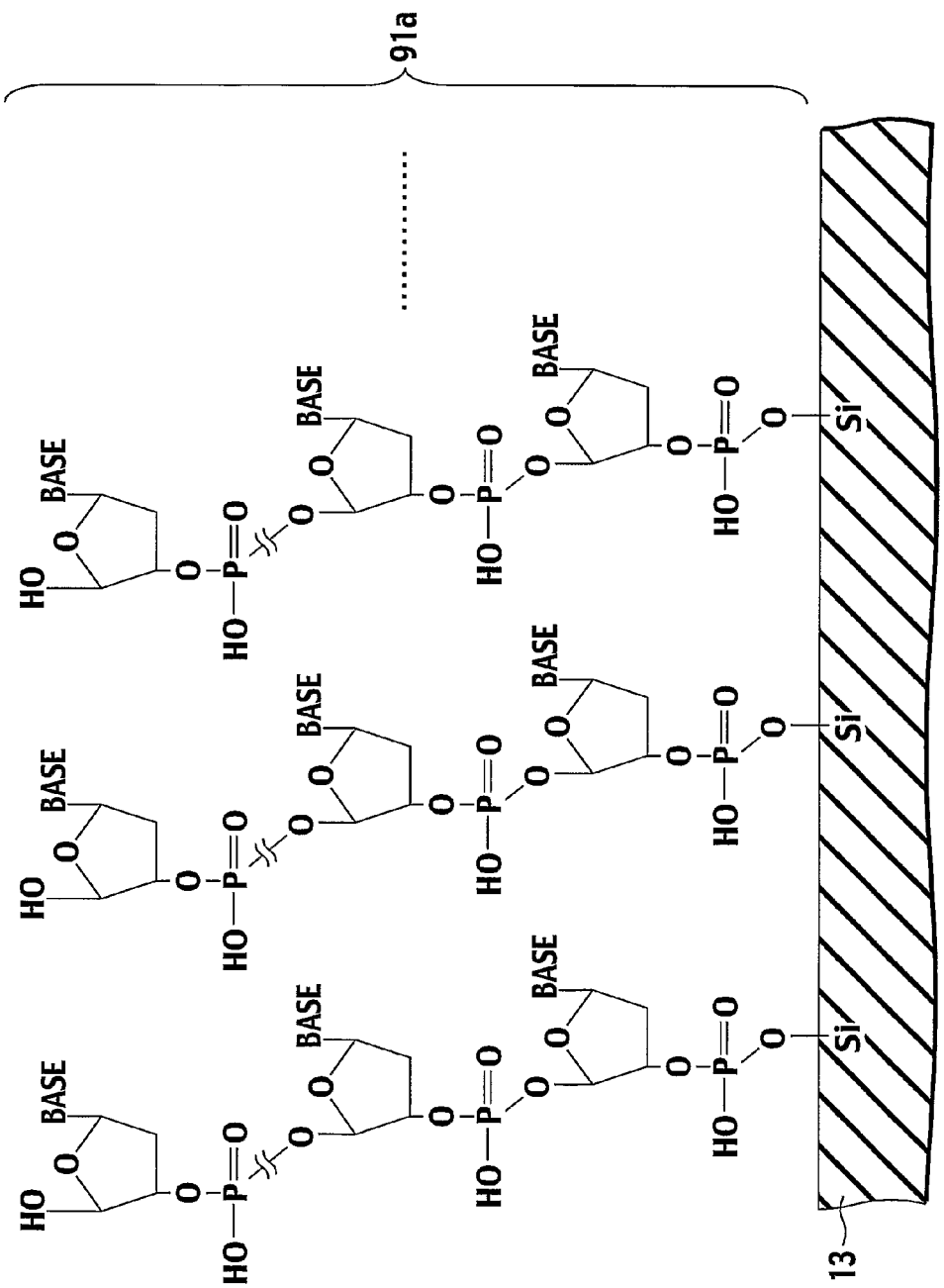
FIG. 28 is an enlarged sectional view of a biomolecule layer in accordance with the third embodiment of the present invention.

In FIG. 26, each of biomolecule layers 91a, 91b, 91c, 91d, 91e, 91f, 91g, 91h, 91i are disposed on the surface of the first layer 13 exhibited by each of the wells 41a-41i. In each of the biomolecule layers 91a-91i, a plurality of probe biomolecules are covalently linked to the first layer 13 by forming covalent bonds between functional groups in the probe biomolecules and hydroxyl (—OH) groups on the first layer 13. Each of the "probe biomolecules" may involve a deoxyribonucleic acid (DNA) chain, a ribonucleic acid (RNA) chain, a peptide nucleic acid (PNA) chain, or a protein. In a case where the probe biomolecules are DNA chains, RNA chains, or PNA chains, each sequence of the probe biomolecules is designed to be complementary to each of target biomolecules. FIG. 28 depicts the DNA chains in the biomolecule layer 91a being covalently linked to the first layer 13.

Figure 29:
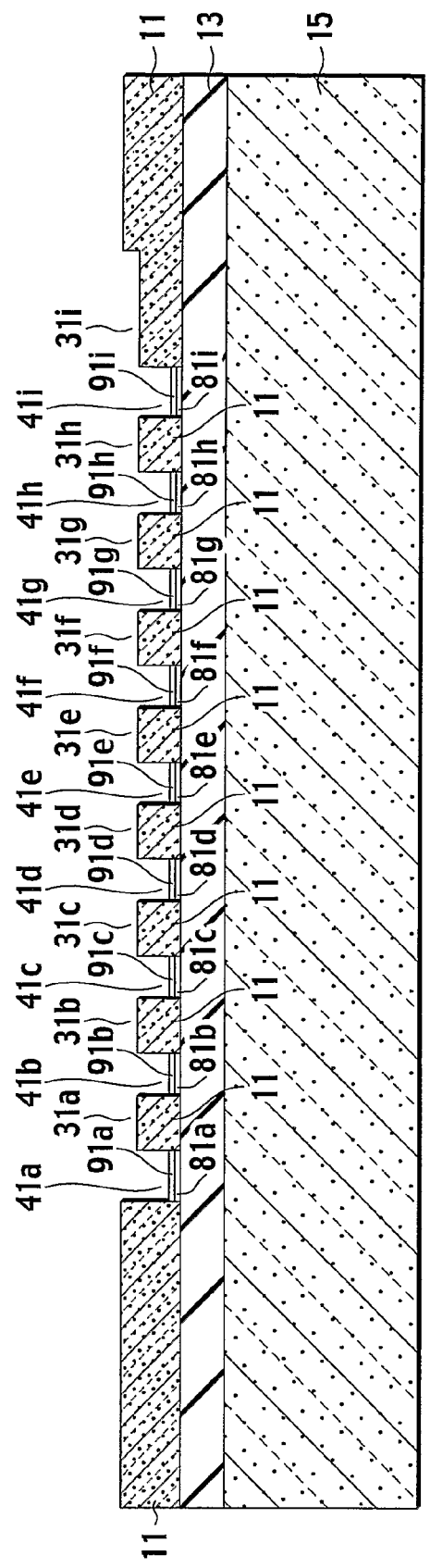
FIG. 29 is a second sectional view taken along line XXVI-XXVI in FIG. 25, showing the substrate for the biochip in accordance with the third embodiment of the present invention.
Figure 30:
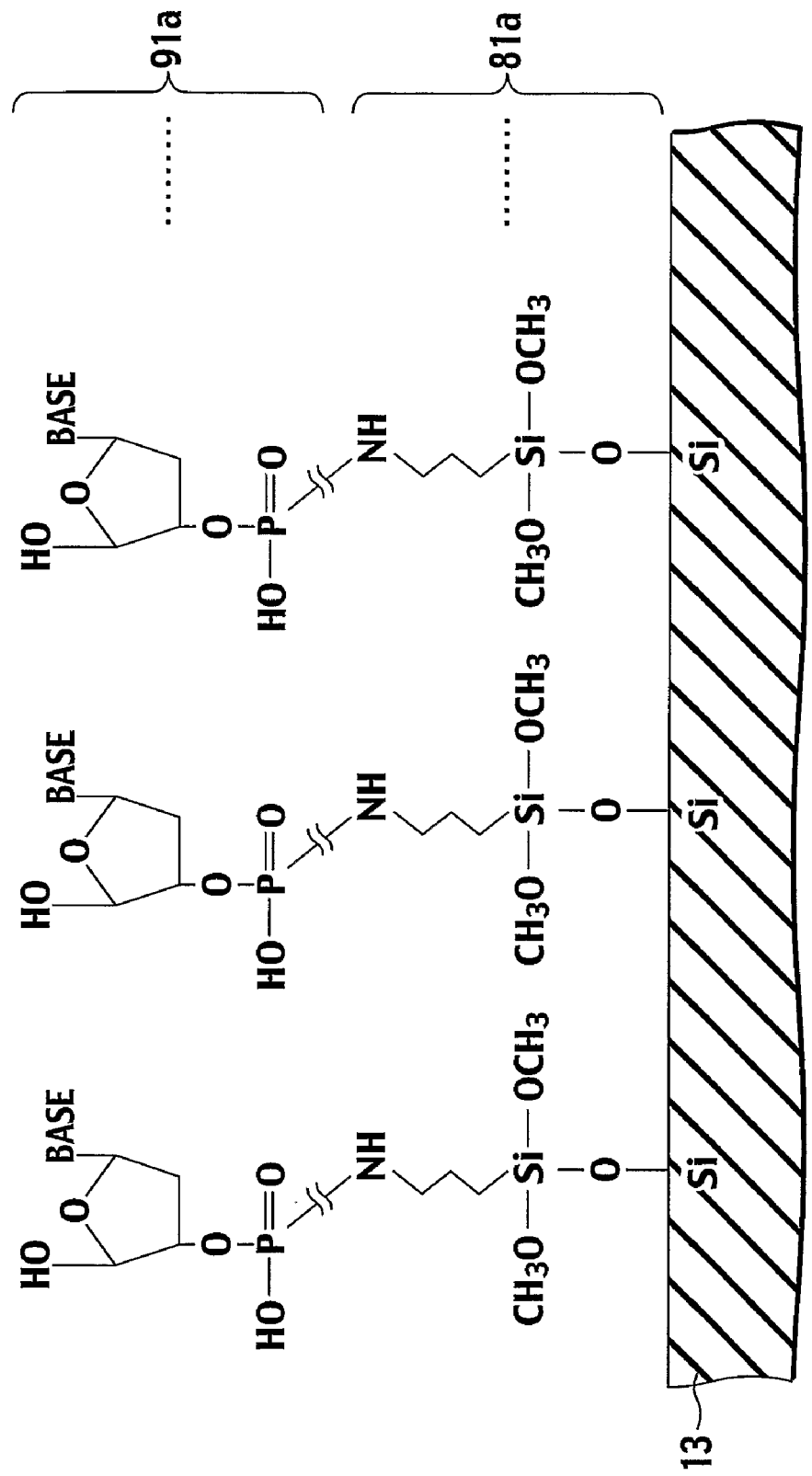
FIG. 30 is a first enlarged sectional view of a silane film and the biomolecule layer in accordance with the third embodiment of the present invention.

It should be noted that the third embodiment is not limited to a case where each of the biomolecule layers 91a-91i is disposed on the first layer 13 directly. With reference to FIG. 29, a plurality of silane films 81a, 81b, 81c, 81d, 81e, 81f, 81g, 81h, 81i are disposed on the first layer 13 exhibited by each of the wells 41a-41i. In each of the silane films 81a-81i, a plurality of silane coupling agents form a matrix on the first layer 13. With reference to FIG. 30, a covalent bond is formed from the acid-base reaction of a methoxy group (—$OCH_3$) in each of the silane coupling agents with the hydroxyl (—OH) group on the first layer 13 by acid-base reaction.

For example, a 3-glycidoxypropyltrimethoxysilane, a 3-glycidoxypropylmethyldiethoxysilane, a 3-glycidoxypropyltriethoxysilane, an N-2(aminoethyl)3-aminopropylmethyldimethoxysilane, an N-2(aminoethyl)3-aminopropyltrimethoxysilane, an N-2(aminoethyl)3-aminopropyltriethoxysilane, a 3-aminopropyltrimethoxysilane, and a 3-aminopropyltriethoxysilane can be used for each of the silane coupling agents.

With reference again to FIG. 29, each of biomolecule layers 91a, 91b, 91c, 91d, 91e, 91f, 91g, 91h, 91i is disposed on each of the silane films 81a-81i. In boundary between each of the biomolecule layers 91a-91i and each of the silane films 81a-81i, an amide bond (—NH—CO—) is formed from the reaction of an active ester introduced to each of the probe biomolecules with each amino group (—$NH_2$) of the silane coupling agents as shown in FIG. 30, for example.

Further, linking each of the silane coupling agents and each of the probe biomolecules by using a crosslinker is an alternative. Protein such as a receptor, a ligand, an antagonist, an antibody, and an antigen contains the functional group such as an amino group (—$NH_2$) in a lysine (Lys), a carboxyl group (—COOH) in an aspartic acid (Asp) and a glutamic acid (Glu), a phenol group (—$C_6H_4$(OH)) in a tyrosine (Tyr), an imidazole group (—$C_3H_3N_2$) in a histidine (His), and a thiol group (—SH) in a cystein. Therefore, the crosslinkers that are reactive toward the amino groups in both ends such as a disuccinimidyl suberate (DSS), a bis[sulfosuccinimidyl]suberate ($BS^3$), a dimethyl suberimidate HCl (DMS), a disuccinimidyl glutarate (DSG), a Loman's reagent, a 3,3'-dithiobis[sulfosuccinimidyl propionate] (DTSSP), an ethylene glycol bis[succinimidylsuccinate] (EGS) can be used for linking the probe biomolecules and the silane coupling agents. Also, the crosslinkers that are reactive toward the amino group and the carboxyl group such as a 1-ethyl-3-[3-dimethylaminopropyl]carbodiimide hydrochloride (EDC) can be used.

Further, the crosslinkers that are reactive toward the amino group and the thiol group such as a m-maleimidobenzyl-N-hydroxysuccinimide ester (MBS), a succinimidyl 4-[N-maleimidomethyl]-cyclohexane-1-carboxylate (SMCC), a succinimidyl 4-p-malemidophenyl]-buthrate (SMPB), an N-Succinimidyl3-[2-pyridyldithio]propionate (SPDP), an N-[γ-Maleimidobutylody]sulcosuccinimide ester (Sulfo-GMBS), a sulfosuccinimidyl 6-[3'(2-pyridyldithio)-propionamide]hexanoate (Sulfo-LC-SPDP), an m-maleimidebenzoyl-N-hydroroxysulfo-succinimide ester (Sulfo-MBS), a sulfosuccinimidyl 4[N-maleimidomethyl]-cyclohexane-1-carboxylate (Sulfo-SMCC), a sulfosuccinimidy 4-[p-maleimidophenyl]-butyrate (Sulfo-SMPB) can be used for linking the probe biomolecules and the silane coupling agents.

Figure 31:
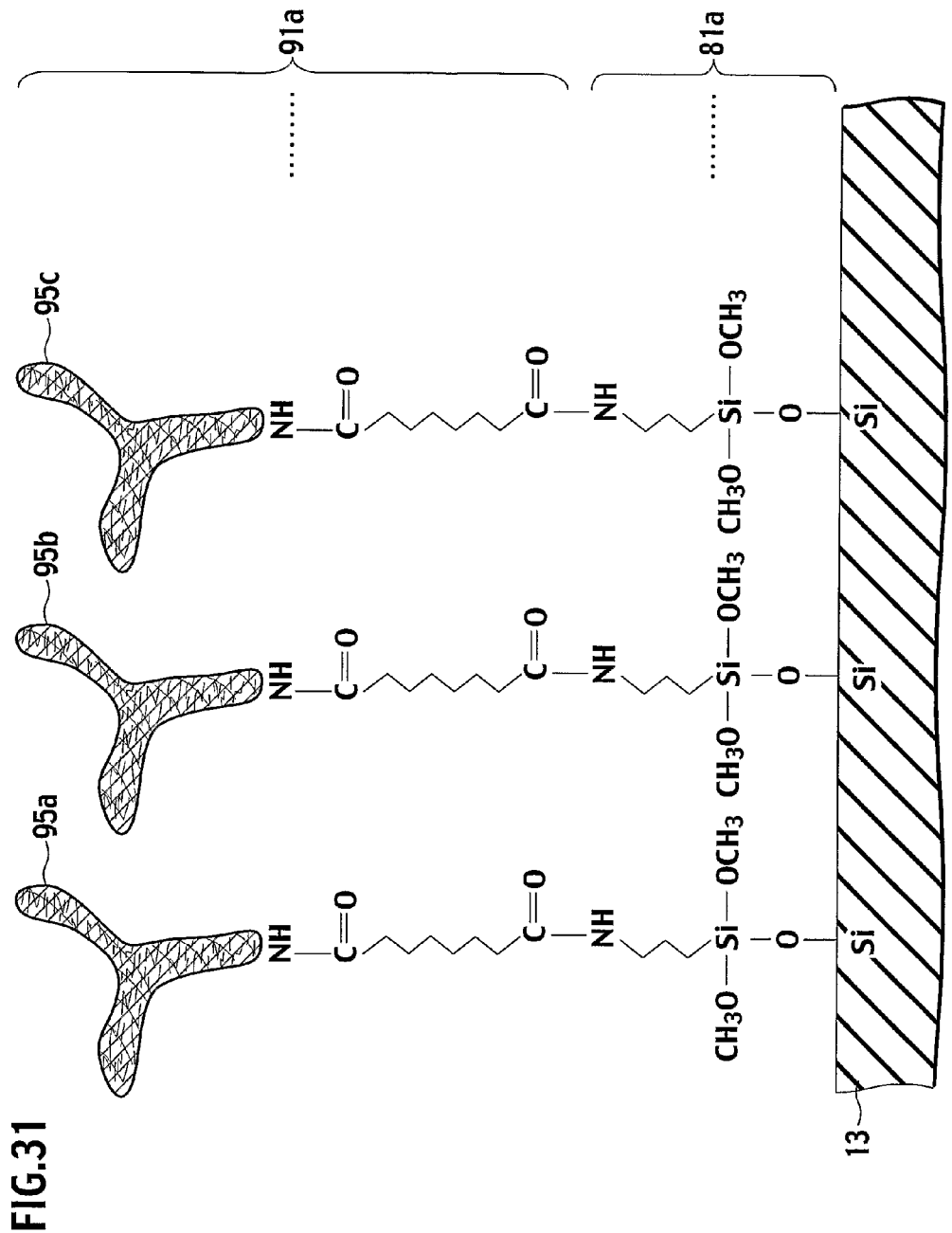
FIG. 31 is a second enlarged sectional view of the silane film and the biomolecule layer in accordance with the third embodiment of the present invention.

In FIG. 31, each amino group of the silane coupling agents and each amino group of the antibodies 95a, 95b, 95c are coupled with the DSS.

Each sectional view of the other wells 42a-42i, 43a-43i, 44a-44i, 45a-45i, 46a-46i, 47a-47i, 48a-48i, 49a-49i shown in FIG. 25 is similar to FIG. 26 or FIG. 29.

It should be noted that a silica glass also can be used for the first layer 13 shown in FIGS. 26 and 29. In this case, the semiconductor substrate 15 can be eliminated. Also, a resin such as polytetrafluoroethylene and insoluble epoxy resist also can be used for the second layer 11.

Figure 32:
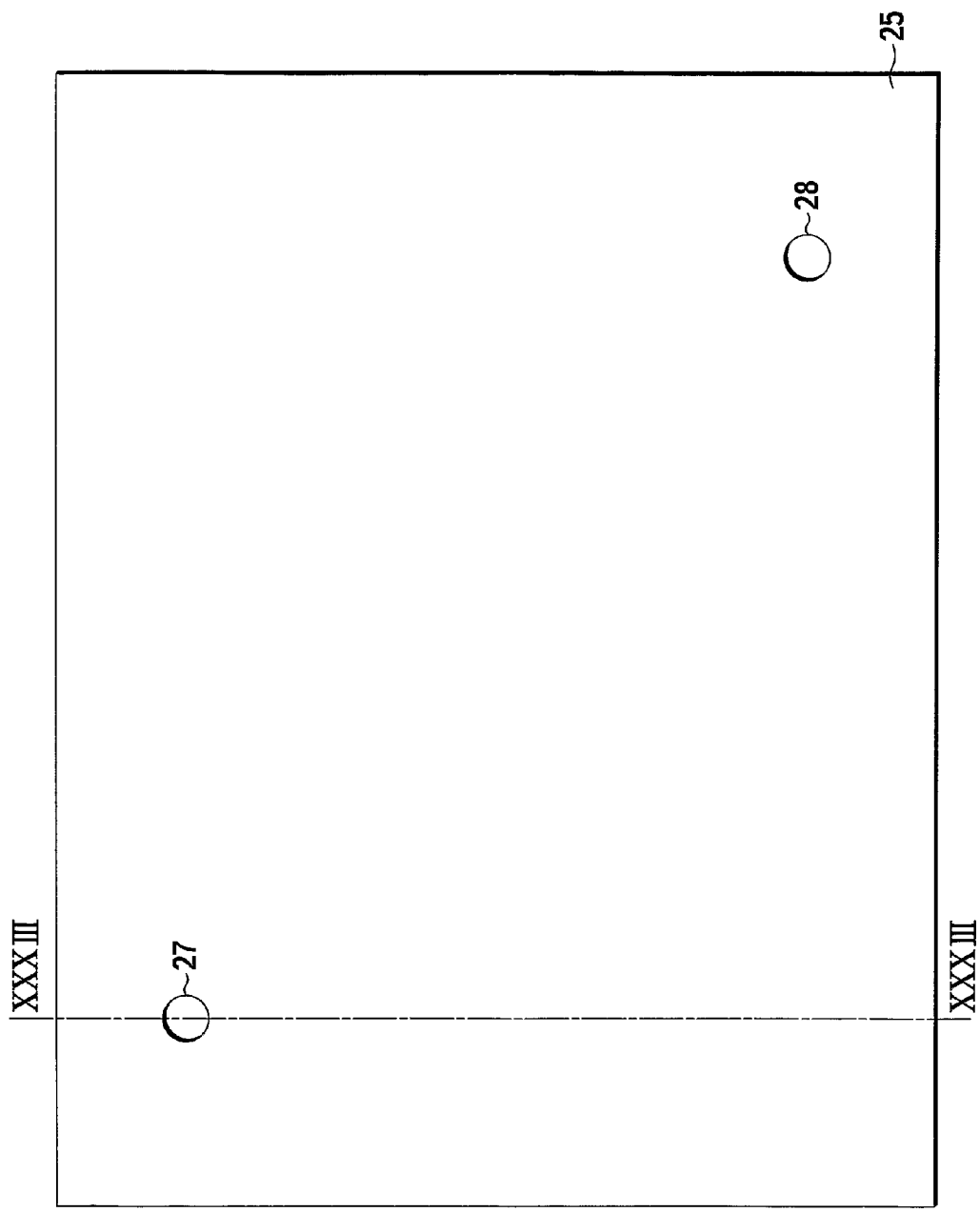
FIG. 32 is a plane view of a cover plate in accordance with the third embodiment of the present invention.
Figure 33:
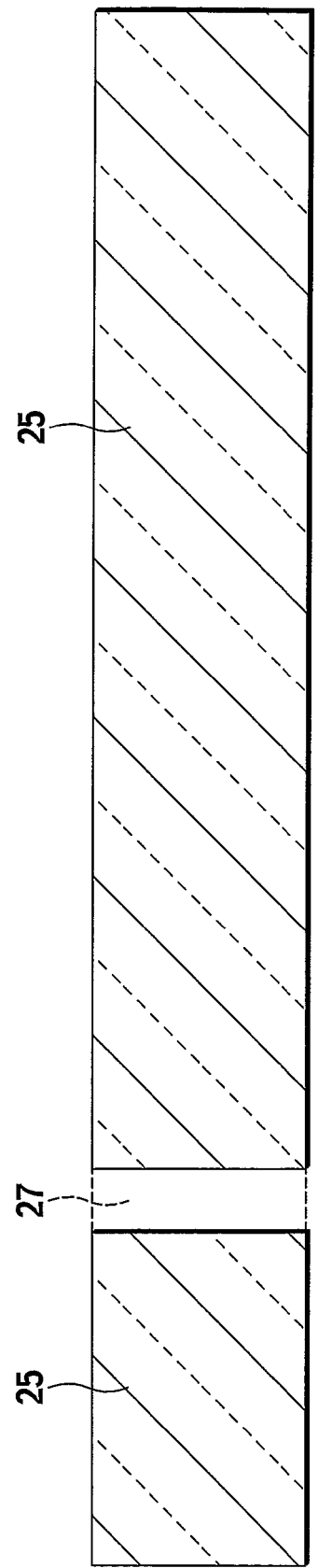
FIG. 33 is a sectional view taken along line XXXIII-XXXIII in FIG. 32, showing the cover plate in accordance with the third embodiment of the present invention.
Figure 34:
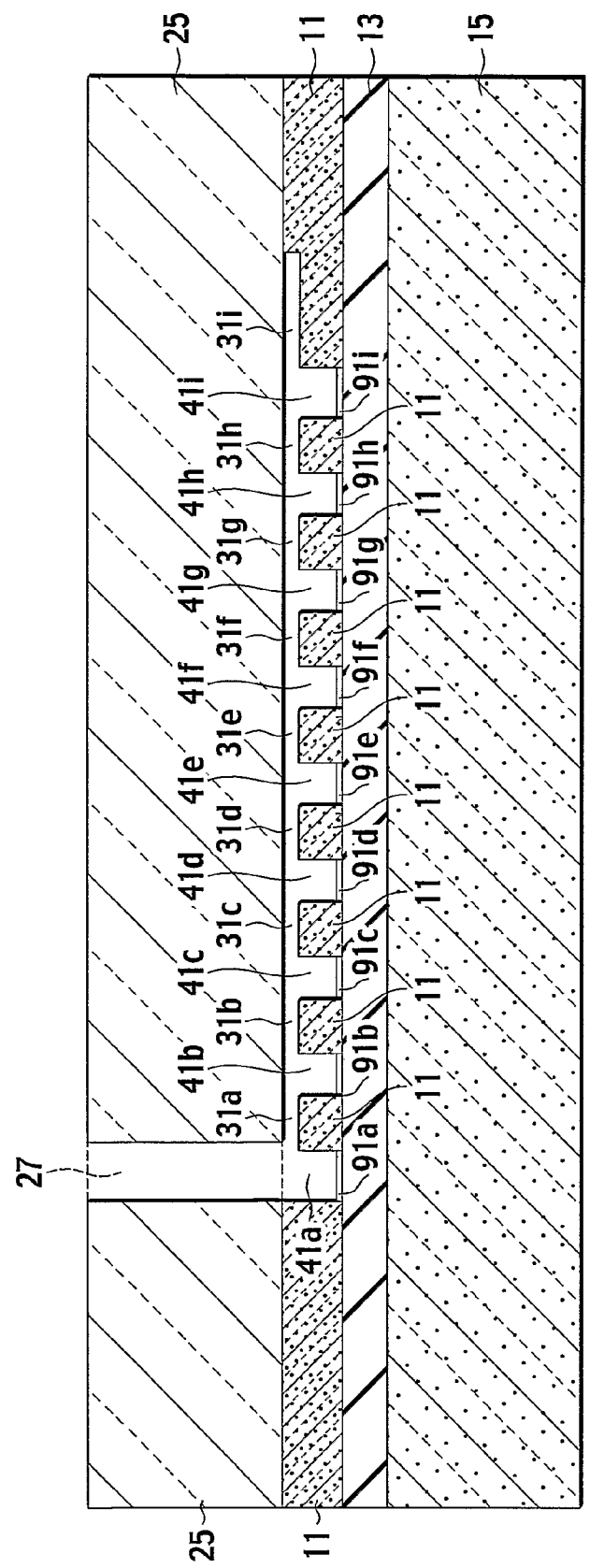
FIG. 34 is a sectional view of the cover plate disposed on the substrate for the biochip in accordance with the third embodiment of the present invention.

The surface of the substrate for the biochip shown in FIGS. 25-31 is covered by a cover plate 25 shown in FIGS. 32 and 33. The cover plate 25 has openings 27, 28. The cover plate 25 is composed of fused silica, acrylic resin, and polycarbonate, for example. FIG. 34 depicts a sectional view in the case where the cover plate 25 is disposed on the substrate for the biochip shown in FIG. 25.

When a hybridization test is performed by the substrate for the biochip, sample solution containing a plurality of sample biomolecules labeled with fluorescent dye such as Cy3, or Cy5 are prepared. Such sample solution may be dispensed into the opening 27. By sucking air from the opening 28, each of the wells 41a-41i and each of the grooves 31a-31i shown in FIG. 34 are filled with the sample solution in order. Further, each of the other wells 42a-42i, 43a-43i, 44a-44i, 45a-45i, 46a-46i, 47a-47i, 48a-48i, 49a-49i and each of the other grooves 32a-32i, 33a-33i, 34a-34i, 35a-35i, 36a-36i, 37a-37i, 38a-38i, 39a-39h shown in FIG. 25 are also filled with the sample solution in order.

In the case where the sample biomolecules contain a plurality of target biomolecules that bond complementarily with the probe biomolecules in the biomolecule layers 91a-91i, the target biomolecules may be trapped in the biomolecule layers 91a-91i. After sucking the sample solution, the wells 41a-41i, 42a-42i, 43a-43i, 44a-44i, 45a-45i, 46a-46i, 47a-47i, 48a-48i, 49a-49i and the grooves 31a-31i, 32a-32i, 33a-33i, 34a-34i, 35a-35i, 36a-36i, 37a-37i, 38a-38i, 39a-39h are rinsed out by buffer. Thereafter, by observing fluorescent reactions, it is possible to examine whether the sample biomolecules contain the target biomolecules or not. The fluorescent reactions are visible to the naked eye in the case where each diameter of the wells 41a-41i, 42a-42i, 43a-43i, 44a-44i, 45a-45i, 46a-46i, 47a-47i, 48a-48i, 49a-49i is larger than 600 μm.

As described above, since the substrate for the biochip shown in FIGS. 25-34 has the wells 41a-41i, 42a-42i, 43a-43i, 44a-44i, 45a-45i, 46a-46i, 47a-47i, 48a-48i, 49a-49i and the grooves 31a-31i, 32a-32i, 33a-33i, 34a-34i, 35a-35i, 36a-36i, 37a-37i, 38a-38i, 39a-39h delineated in the second layer 11, it is possible to eliminate precise alignment of the cover plate 25 on the substrate for the biochip. Further, required sample solution volume is equal to the total volume of the wells 41a-41i, 42a-421, 43a-43i, 44a-44i, 45a-45i, 46a-46i, 47a-47i, 48a-48i, 49a-49i and the grooves 31a-31i, 32a-32i, 33a-33i, 34a-34i, 35a-35i, 36a-36i, 37a-37i, 38a-38i, 39a-39h. Therefore, it is possible to reduce the sample solution volume. Also, the grooves 31a-31i, 32a-32i, 33a-33i, 34a-34i, 35a-35i, 36a-36i, 37a-37i, 38a-38i, 39a-39h eliminate the need to fill each of the wells 41a-41i, 42a-421, 43a-43i, 44a-44i, 45a-45i, 46a-46i, 47a-47i, 48a-48i, 49a-49i with the sample solution by spotting device. Therefore, it is possible to shorten the hybridization test period.

With reference next to FIGS. 35-56, a method for manufacturing the substrate for the biochip according to the third embodiment is described.

Figure 35:
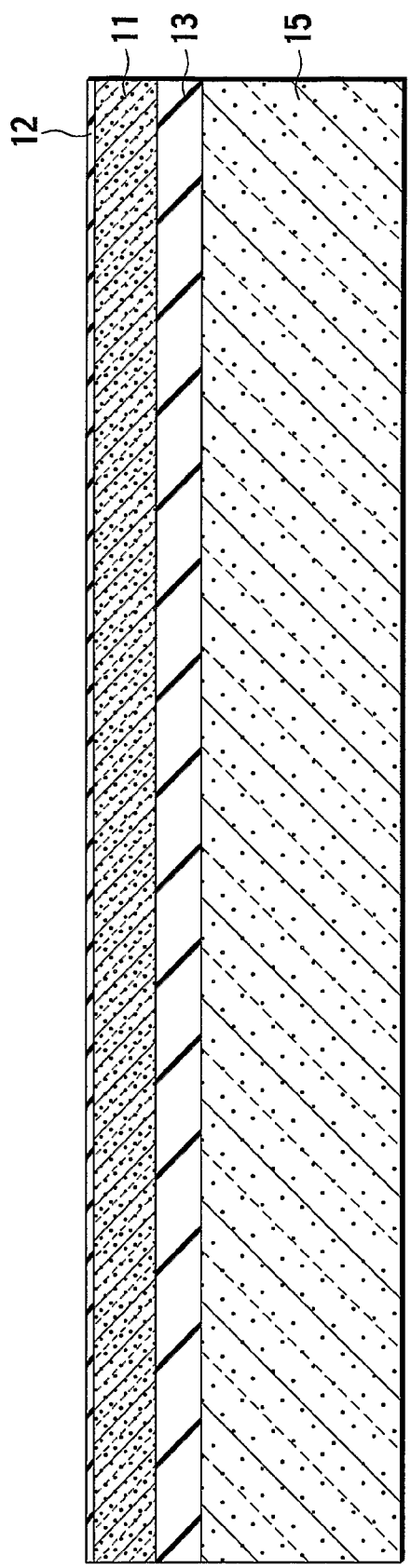
FIG. 35 is a first sectional view of the substrate for the biochip depicting a manufacturing process in accordance with the third embodiment of the present invention.
Figure 36:
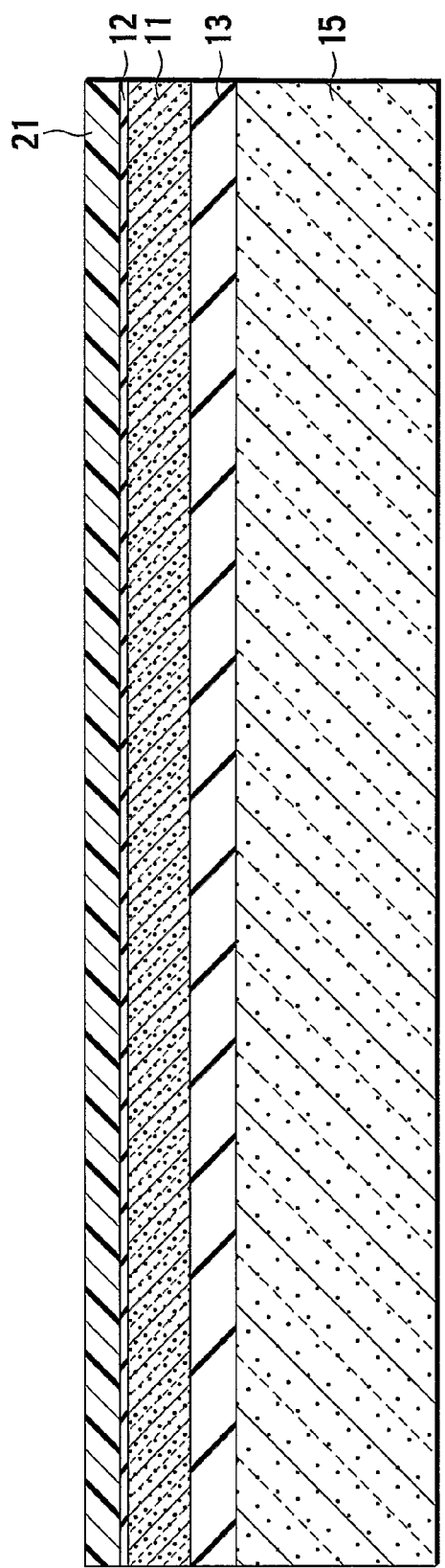
FIG. 36 is a second sectional view of the substrate for the biochip depicting the manufacturing process in accordance with the third embodiment of the present invention.

In FIG. 35, an SOI (Silicon On Insulator) substrate having the semiconductor substrate 15, the first layer 13 composed of $SiO_2$ and disposed on the semiconductor substrate 15, the second layer 11 composed of the crystal silicon and disposed on the first layer 13, and a native oxide film 12 disposed on the second layer 11 is prepared. Then, a resist 21 is coated on the native oxide film 12 by a spin coater as shown in FIG. 36.

Figure 37:
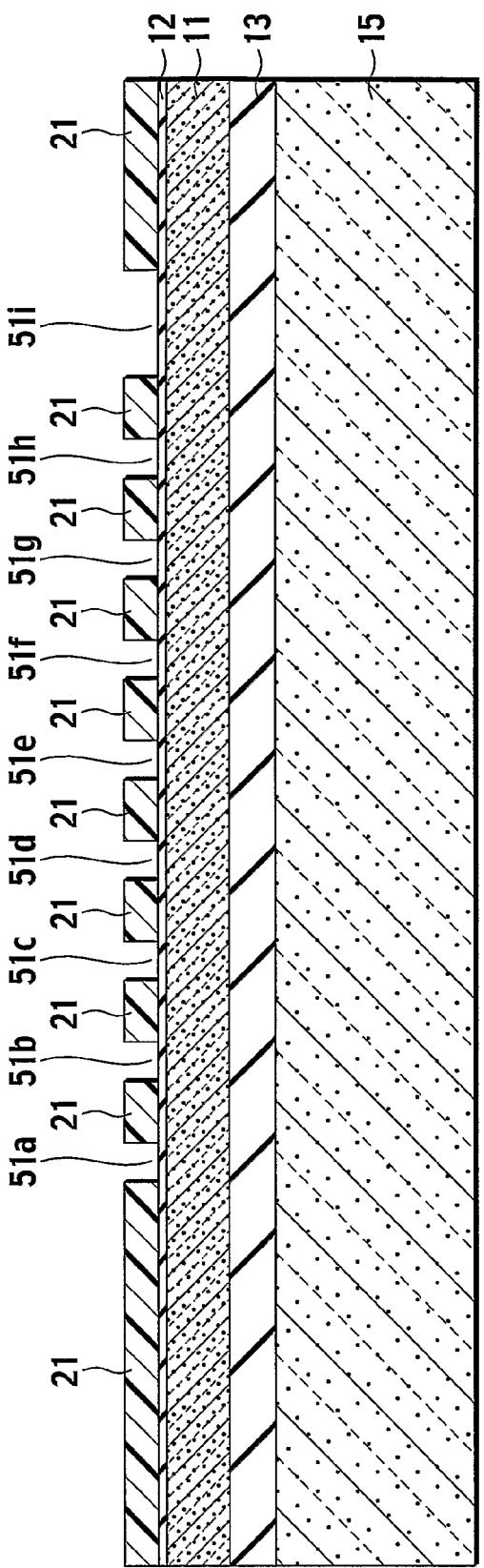
FIG. 37 is a third sectional view of the substrate for the biochip depicting the manufacturing process in accordance with the third embodiment of the present invention.
Figure 38:
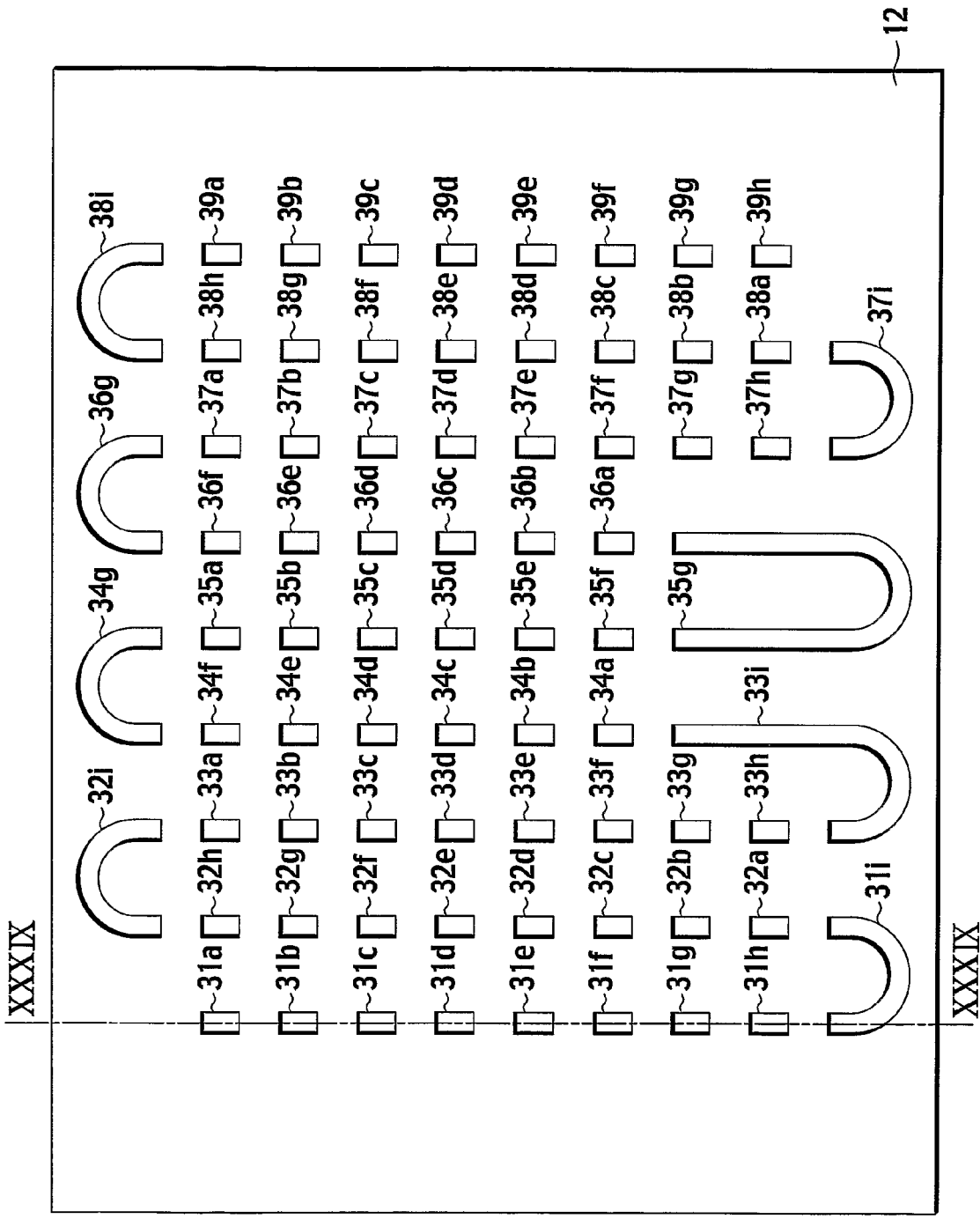
FIG. 38 is a plane view of the substrate for the biochip depicting the manufacturing process in accordance with the third embodiment of the present invention.
Figure 39:
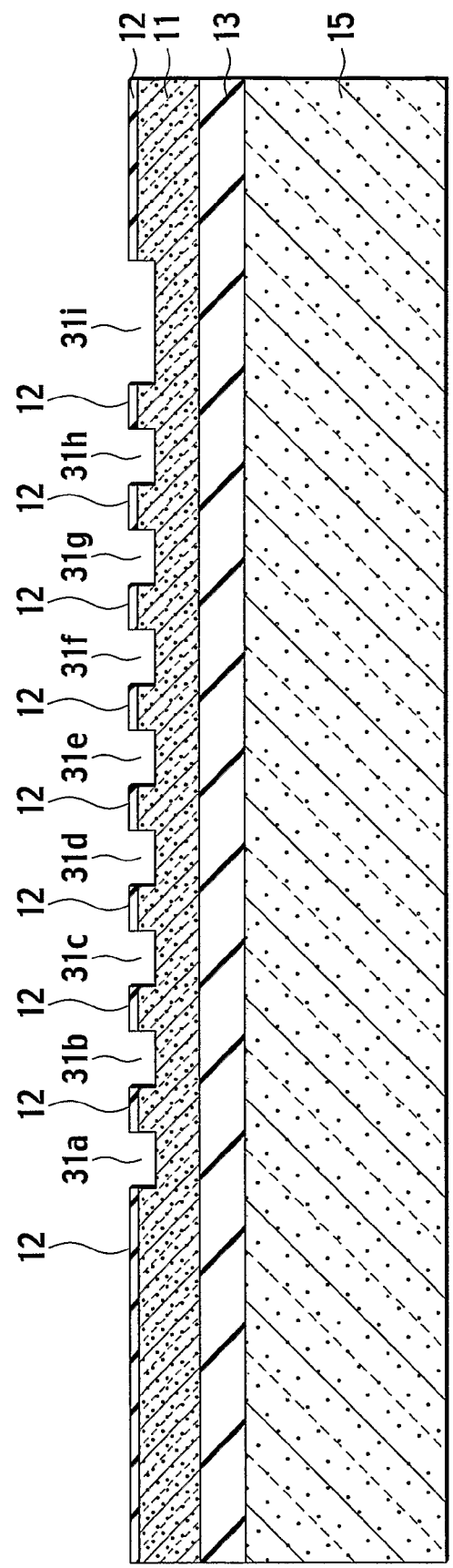
FIG. 39 is a fourth sectional view taken along line XXXIX-XXXIX in FIG. 38, depicting the manufacturing process in accordance with the third embodiment of the present invention.

The parts of the resist 21 are selectively etched by using a photolithography process. Accordingly, a plurality of openings 51a, 51b, 51c, 51d, 51e, 51f, 51g, 51h, 51i are formed in the resist 21 as shown in FIG. 37. Thereafter, the native oxide film 12 exhibited by the openings 51a-51i and the parts of the second layer 11 are selectively etched. Accordingly, the grooves 31a-31i, 32a-32i, 33a-33i, 34a-34i, 35a-35i, 36a-36i, 37a-37i, 38a-38i, 39a-39h are delineated in the second layer 11 as shown in FIGS. 38 and 39.

Figure 40:
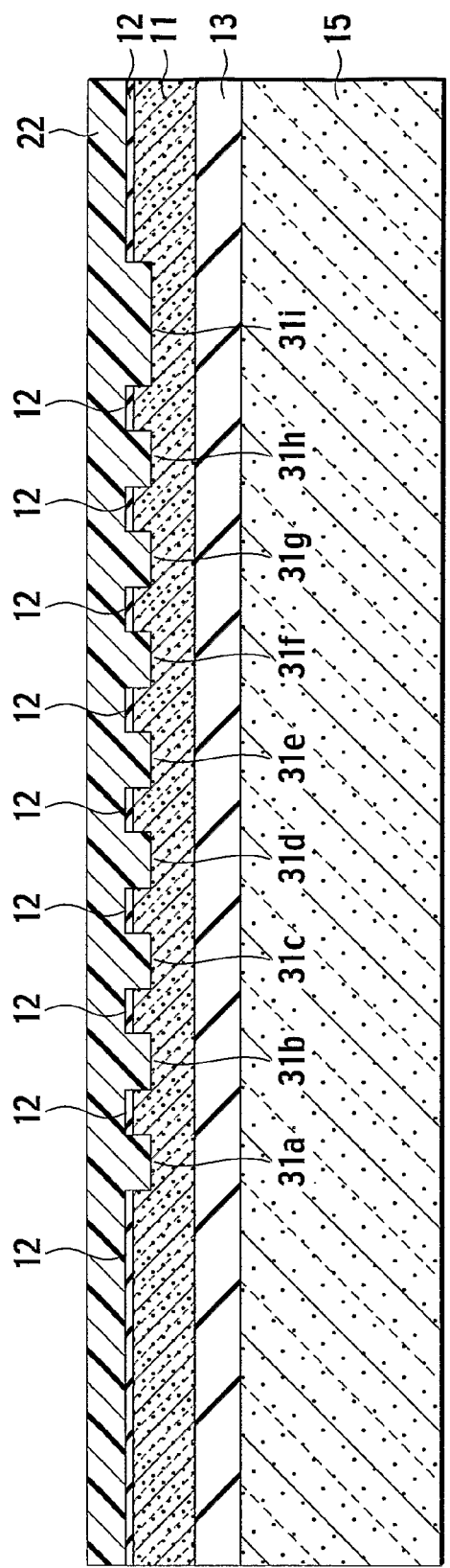
FIG. 40 is a fifth sectional view of the substrate for the biochip depicting the manufacturing process in accordance with the third embodiment of the present invention.
Figure 41:
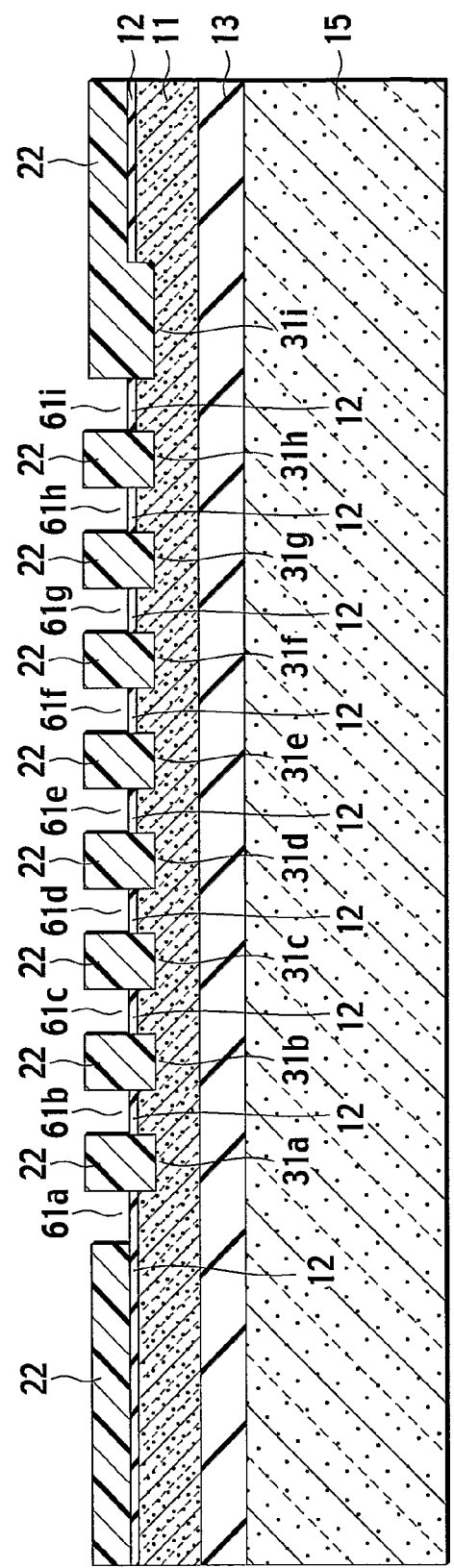
FIG. 41 is a sixth sectional view of the substrate for the biochip depicting the manufacturing process in accordance with the third embodiment of the present invention.
Figure 42:
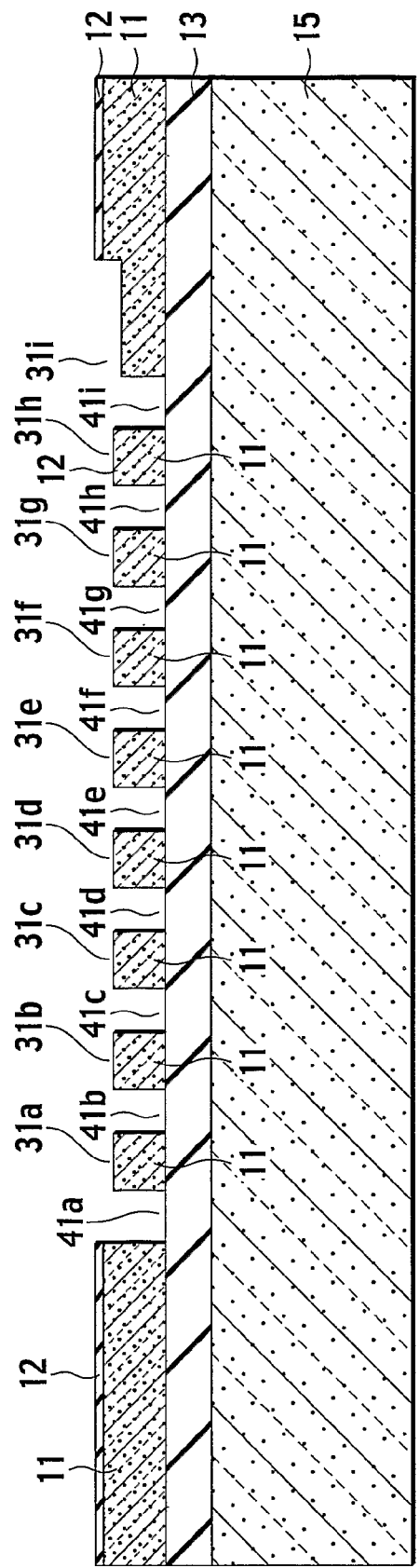
FIG. 42 is a seventh sectional view of the substrate for the biochip depicting the manufacturing process in accordance with the third embodiment of the present invention.

In FIG. 40, a resist 22 is coated on the native oxide film 12 by the spin coater. Thereafter, the parts of the resist 22 are selectively etched by using the photolithography process. Accordingly, a plurality of openings 61a, 61b, 61c, 61d, 61e, 61f, 61g, 61h, 61i are formed in the resist 22 as shown in FIG. 41. Thereafter, the native oxide film 12 exhibited by the openings 61a-61i and the parts of the second layer 11 are selectively etched until the first layer 13 is exhibited. Consequently, the wells 41a-41i are delineated in the second layer 11 as shown in FIG. 42.

Figure 43:
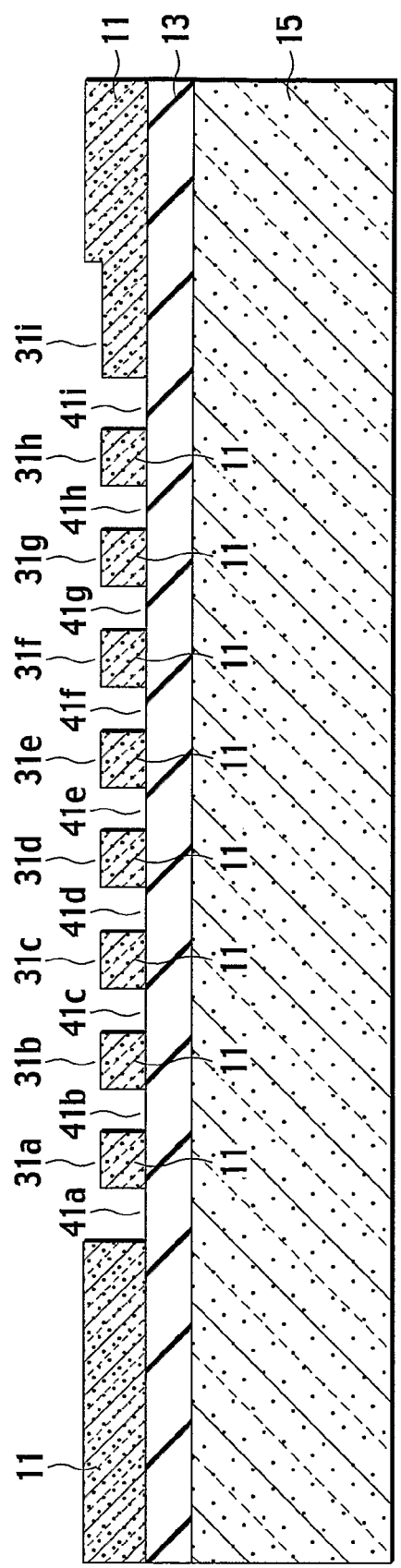
FIG. 43 is a eighth sectional view of the substrate for the biochip depicting the manufacturing process in accordance with the third embodiment of the present invention.
Figure 44:
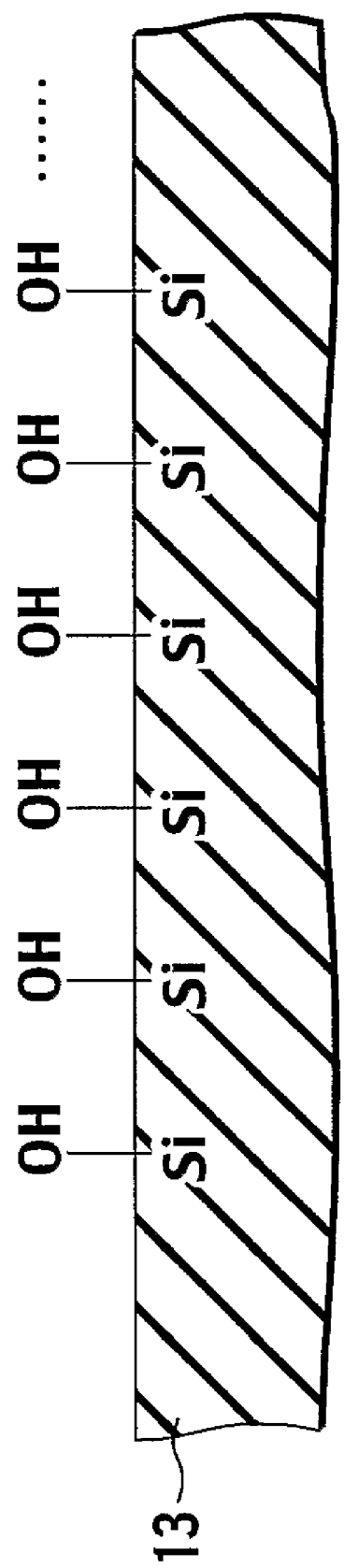
FIG. 44 is a ninth sectional view of the substrate for the biochip depicting the manufacturing process in accordance with the third embodiment of the present invention.

The SOI substrate is dipped into a stirred sodium hydrate solution for two hours at room temperature. The sodium hydrate solution is made by mixing 98 g of sodium hydrate, 294 ml of distilled water, and 392 ml of ethanol. By dipping the SOI substrate into the sodium hydrate solution, the native oxide film 12 on the second layer 11 is removed as shown in FIG. 43. Further, the parts of the surface of the first layer 13 exhibited by the wells 41a-41i are hydroxylated. Therefore, a plurality of hydroxyl (—OH) groups are introduced on the parts of the surface of the first layer 13 as shown in FIG. 44.

Figure 45:
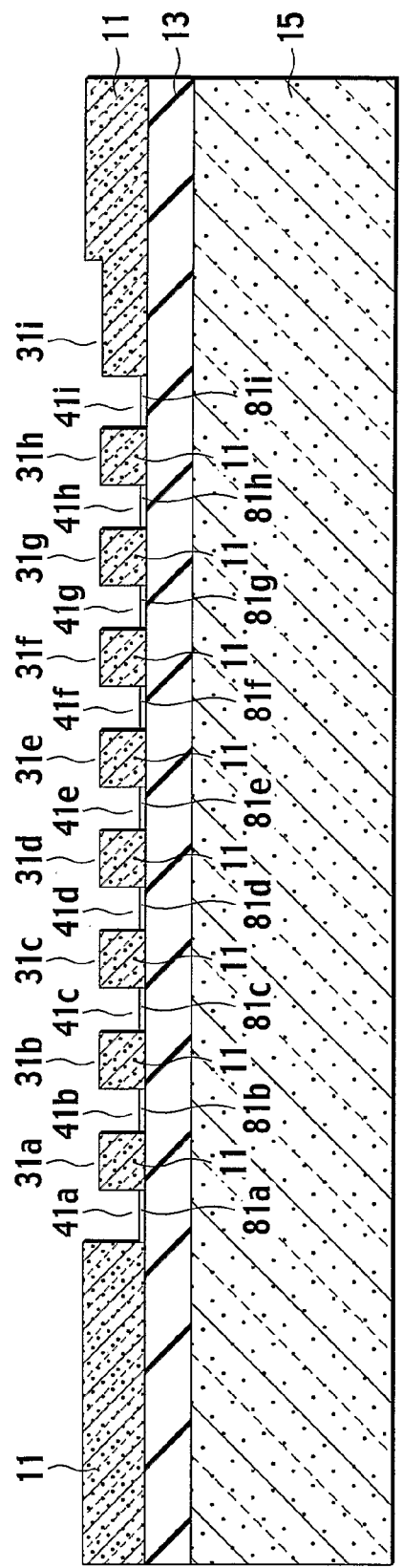
FIG. 45 is a tenth sectional view of the substrate for the biochip depicting the manufacturing process in accordance with the third embodiment of the present invention.
Figure 46:
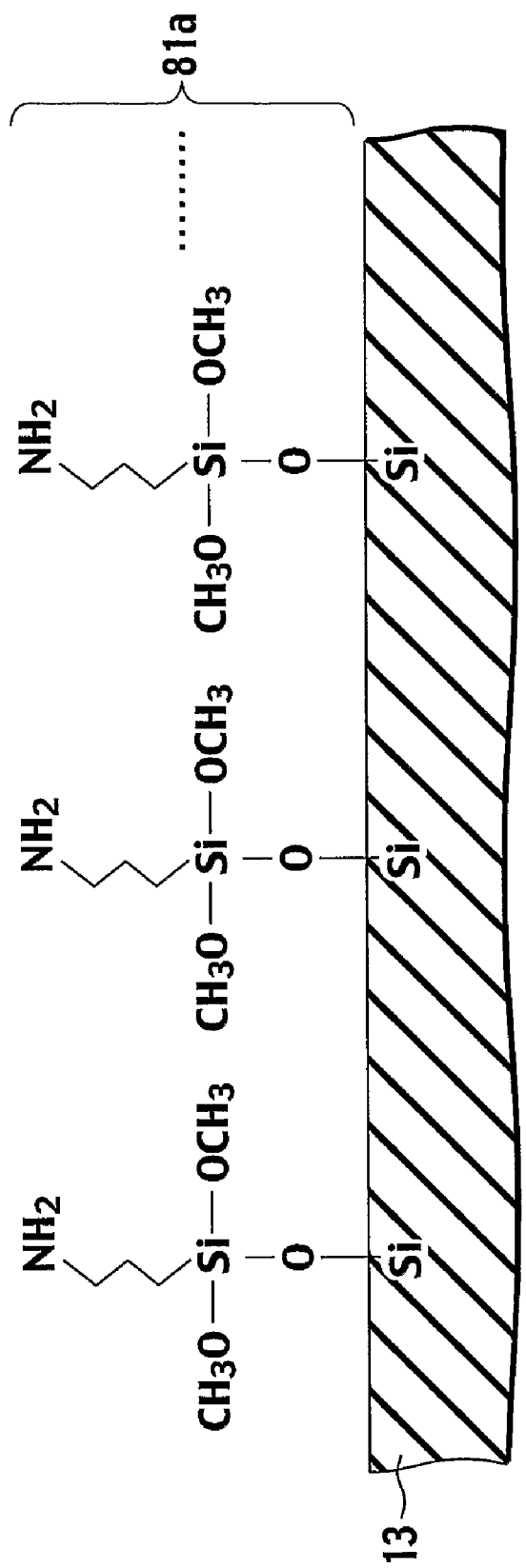
FIG. 46 is a eleventh sectional view of the substrate for the biochip depicting the manufacturing process in accordance with the third embodiment of the present invention.

The silane coupling agent having the epoxy group such as the 3-glycidoxypropylmethyldiethoxysilane, the 3-glycidoxypropyltriethoxysilane, or the silane coupling agent having the amino group such as the N-2(aminoethyl)3-aminopropyltriethoxysilane, the 3-aminopropyltrimethoxysilane, and the 3-aminopropyltriethoxysilane is dispensed on the parts of the surface of the first layer 13 exhibited by the wells 41a-41i shown in FIG. 43. Consequently, the silane films 81a, 81b, 81c, 81d, 81e, 81f, 81g, 81h, 81i are formed on the first layer 13 as shown in FIG. 45. When the 3-aminopropyltrimethoxysilane is dropped on the first layer 13, a plurality of the amino (—NH_2) groups are introduced on the surface of the first layer 13 as shown in FIG. 46. Thereafter, remaining free hydroxyl (—OH) groups on the first layer 13 are capped to prevent participating in the rest of synthesis reactions. For example, the remaining free hydroxyl (—OH) groups are acetylated by acetic anhydride and 1-methyl imidazole (tetrahydrofuran solution).

Figure 48:
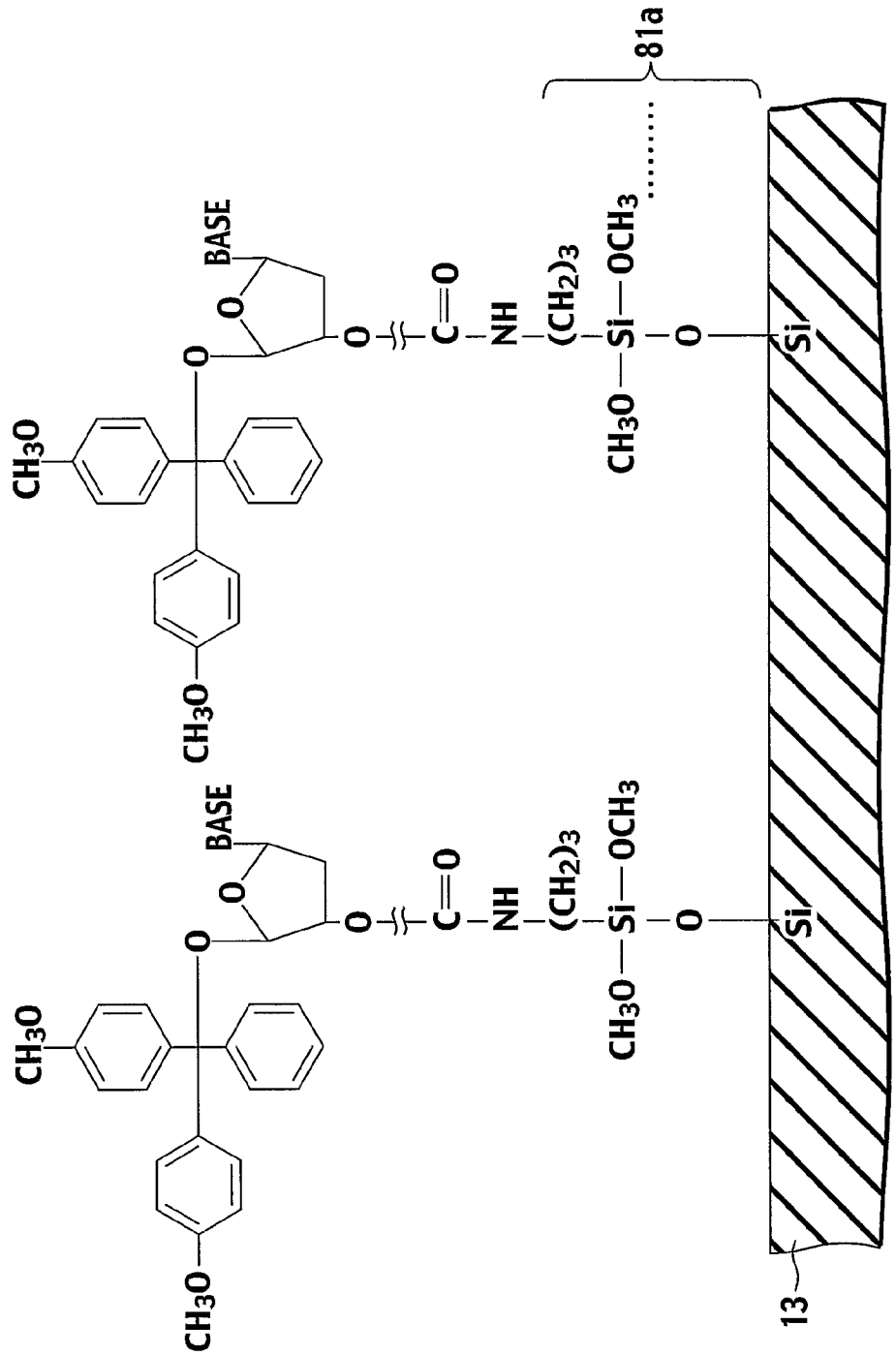
FIG. 48 is a twelfth sectional view of the substrate for the biochip depicting the manufacturing process in accordance with the third embodiment of the present invention.
Figure 49:
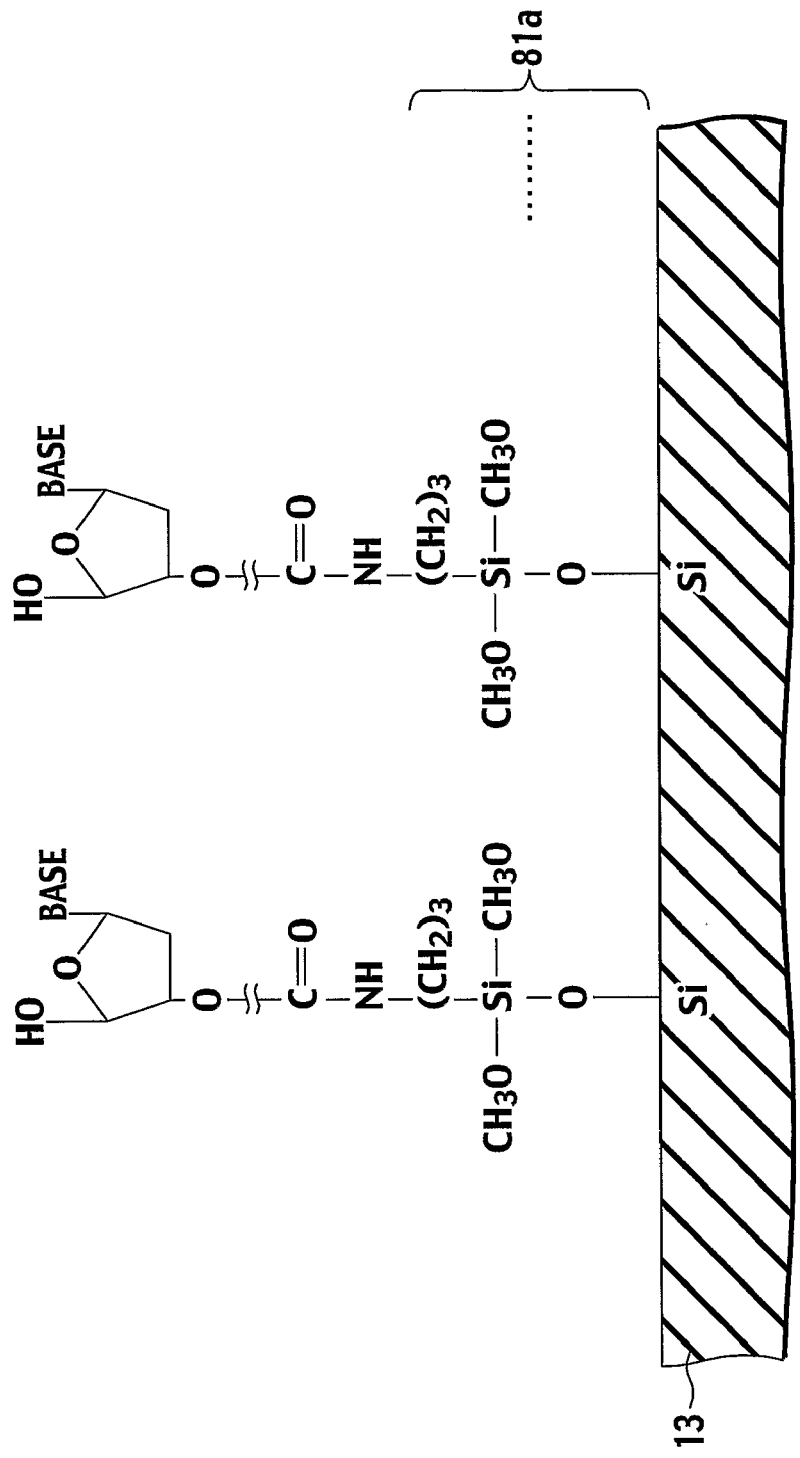
FIG. 49 is a thirteenth sectional view of the substrate for the biochip depicting the manufacturing process in accordance with the third embodiment of the present invention.

A solution containing first nucleosides having active esters is prepared. Each of the first nucleosides is blocked at the 5'-hydroxyl with a dimethoxytrityl (DMTr) group. In each base of the first nucleosides, an amino group of an adenine or a cytosine is protected with a benzoyl group, and an amino group of a guanine is protected with an isobutyl group as shown in FIG. 47. The solution containing the first nucleosides is dispensed onto the silane film 81a shown in FIG. 46. Accordingly, each active ester of the first nucleosides reacts with each amino group of the silane coupling agents to form an amide bond (—NH—CO—) as shown in FIG. 48. Thereafter, each DMTr of the first nucleosides is removed by 3% trichloroacetic acid in dichloromethane (DCM). In FIG. 49, the 5' hydroxyl (—OH) group is now the only reactive group on each of the first nucleosides.

Figure 50:
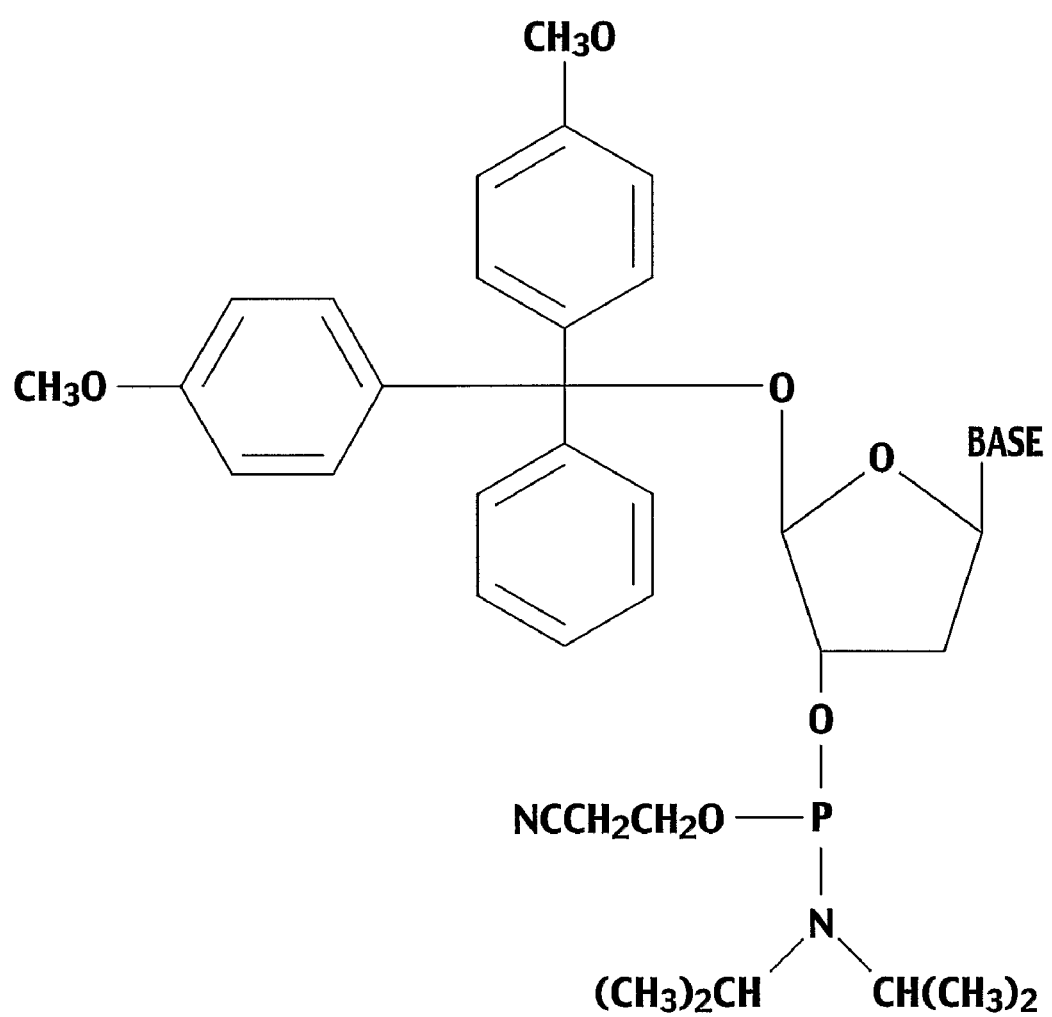
FIG. 50 depicts a phosphoramidite in accordance with the third embodiment of the present invention.
Figure 51:
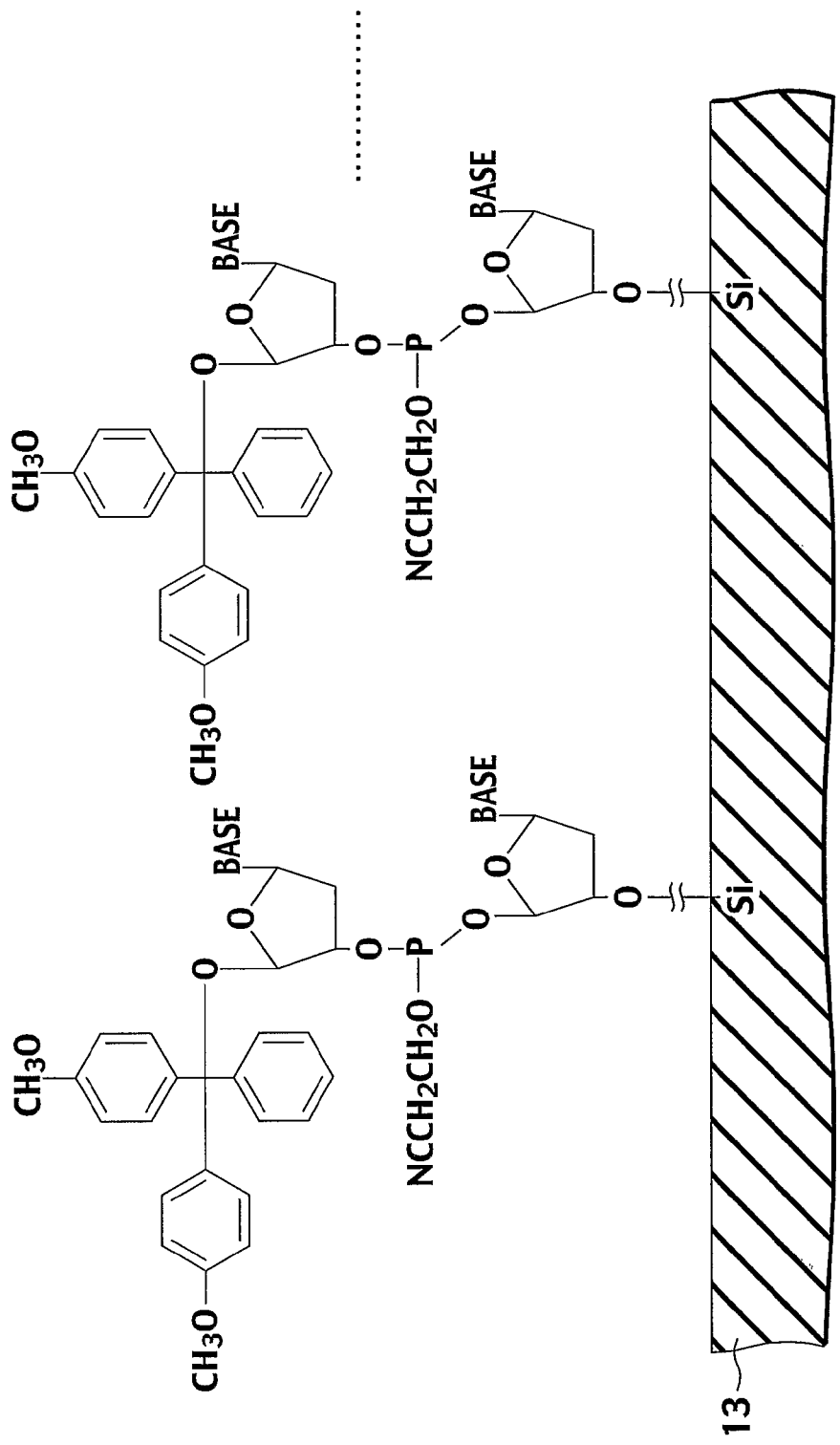
FIG. 51 is a fourteenth sectional view of the substrate for the biochip depicting the manufacturing process in accordance with the third embodiment of the present invention.

A solution containing tetrazoles and a plurality of phosphoramidites that are derivatives of second nucleosides shown in FIG. 50 is dispensed onto the silane films 81a-81i. In FIG. 51, each active 5' hydroxyl (—OH) group of the first nucleosides and each N,N-di-isopropylamine of the second nucleosides form an unstable phosphite linkage by a condensation reaction. Thereafter, the unbounded, active 5'-hydroxyl (—OH) groups of the first nucleosides are capped with protective groups. For example, the 5'-hydroxyl (—OH) groups are acetylated by adding acetic anhydride and 1-methylimidazole onto the first layer 13.

Figure 52:
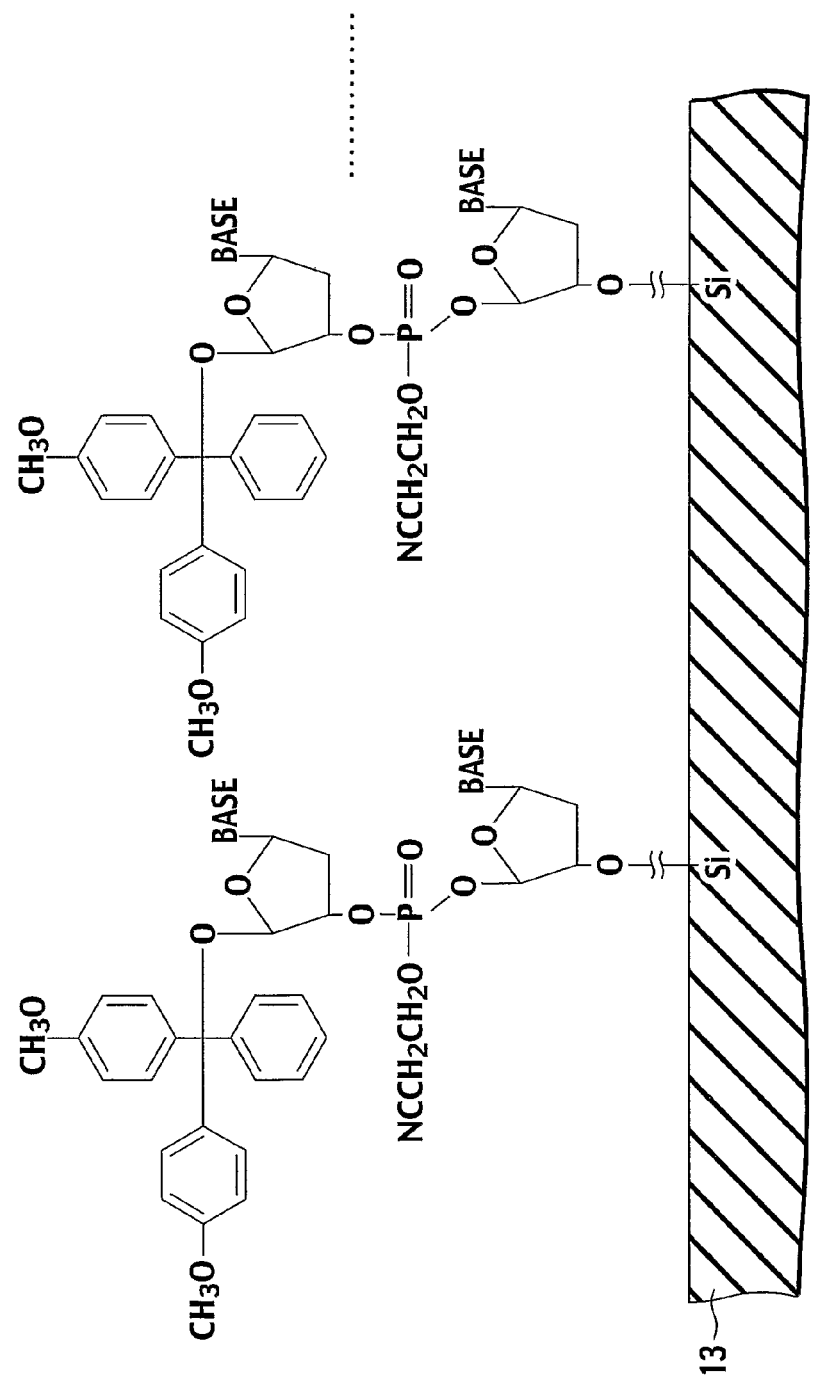
FIG. 52 is a fifteenth sectional view of the substrate for the biochip depicting the manufacturing process in accordance with the third embodiment of the present invention.
Figure 53:
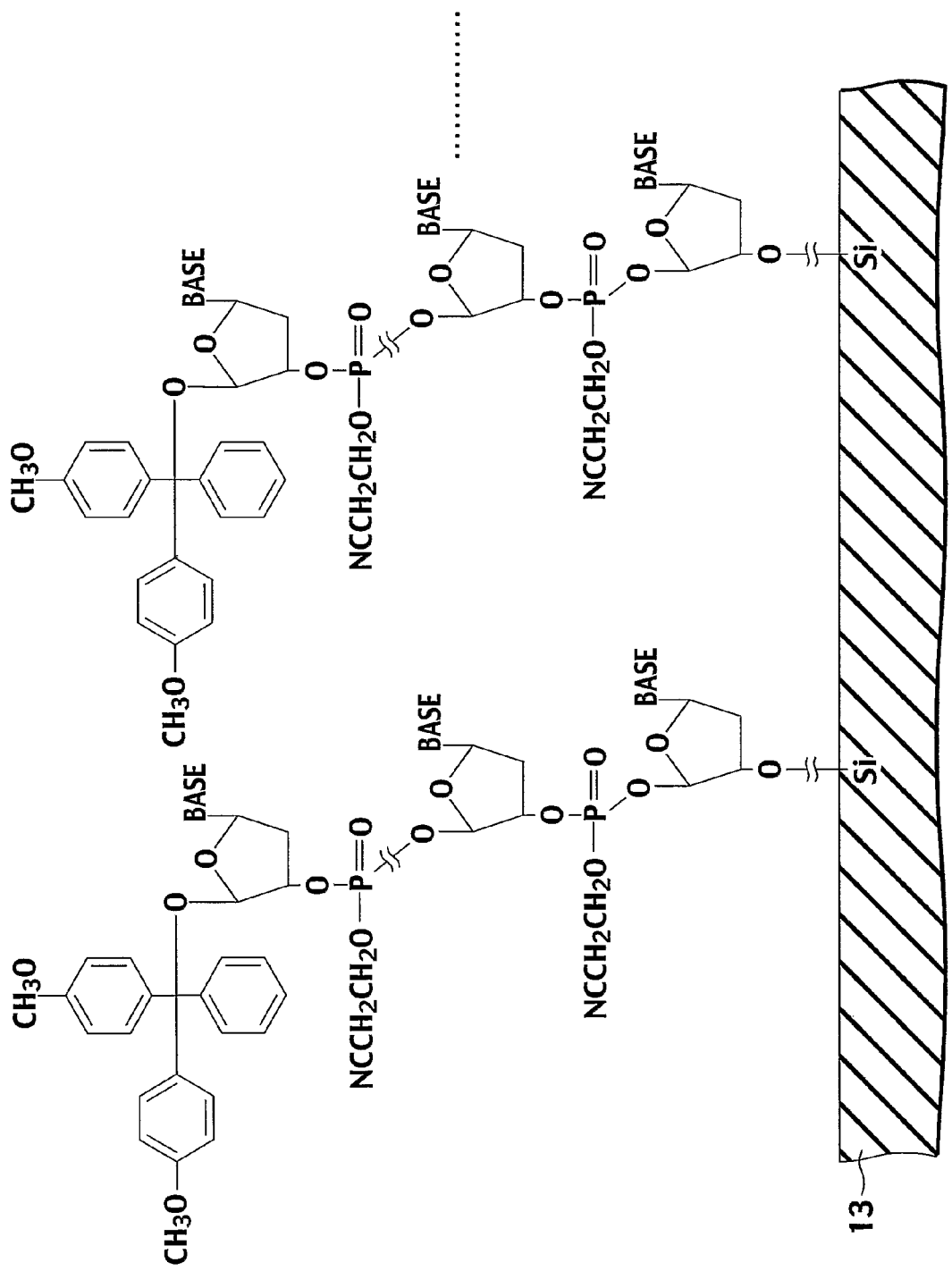
FIG. 53 is a sixteenth sectional view of the substrate for the biochip depicting the manufacturing process in accordance with the third embodiment of the present invention.

To stabilize the unstable phosphite linkage, a solution of dilute iodine in water, pyridine, and tetrahydrofuran is added onto the first layer 13. In FIG. 52, the unstable phosphite linkage is oxidized to form a much more stable phosphate linkage. Thereafter, each DMTr of the second nucleosides is removed and the condensation reactions are repeated until chain elongation is complete as shown in FIG. 53.

Figure 54:
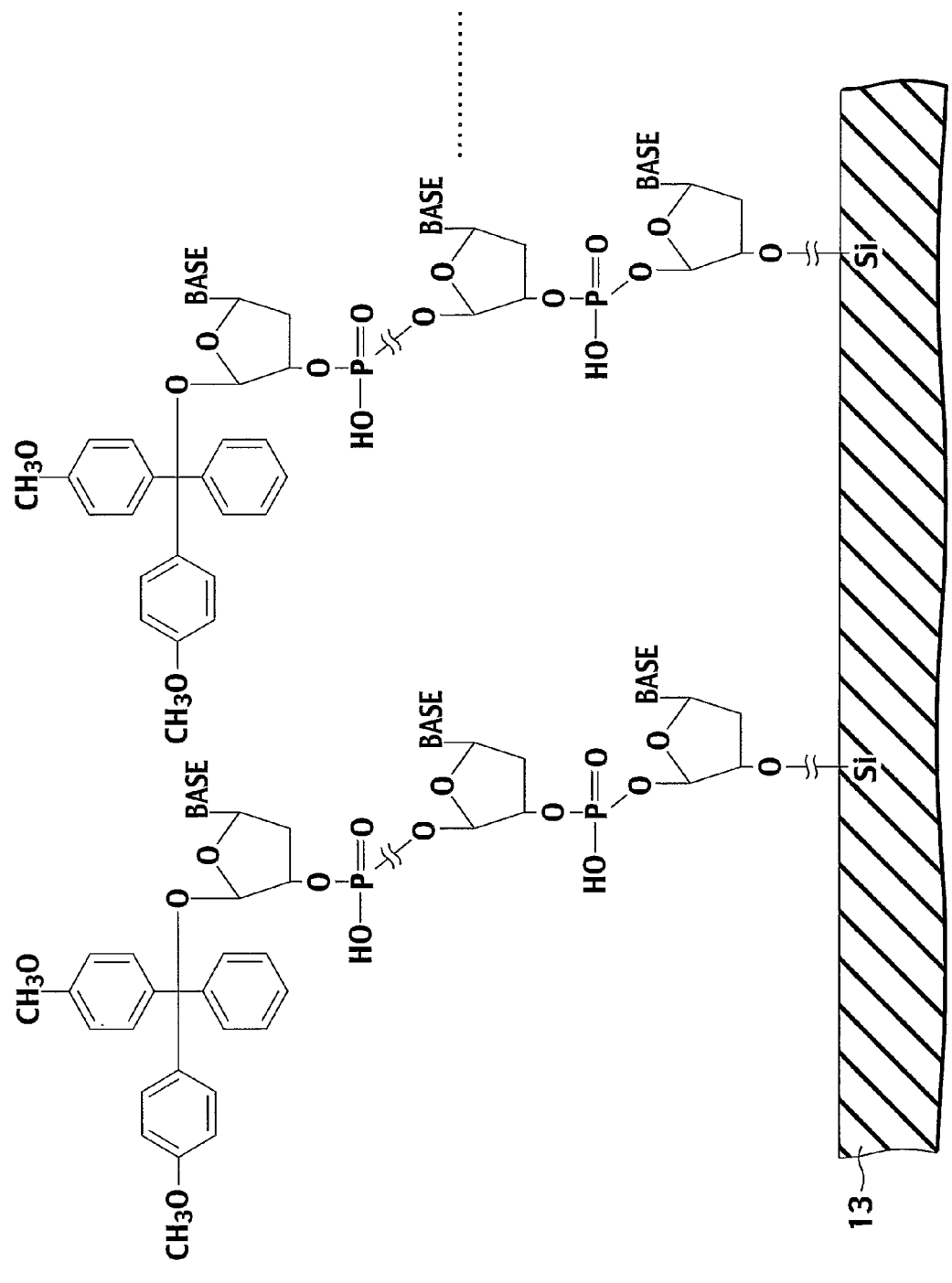
FIG. 54 is a seventeenth sectional view of the substrate for the biochip depicting the manufacturing process in accordance with the third embodiment of the present invention.
Figure 56:
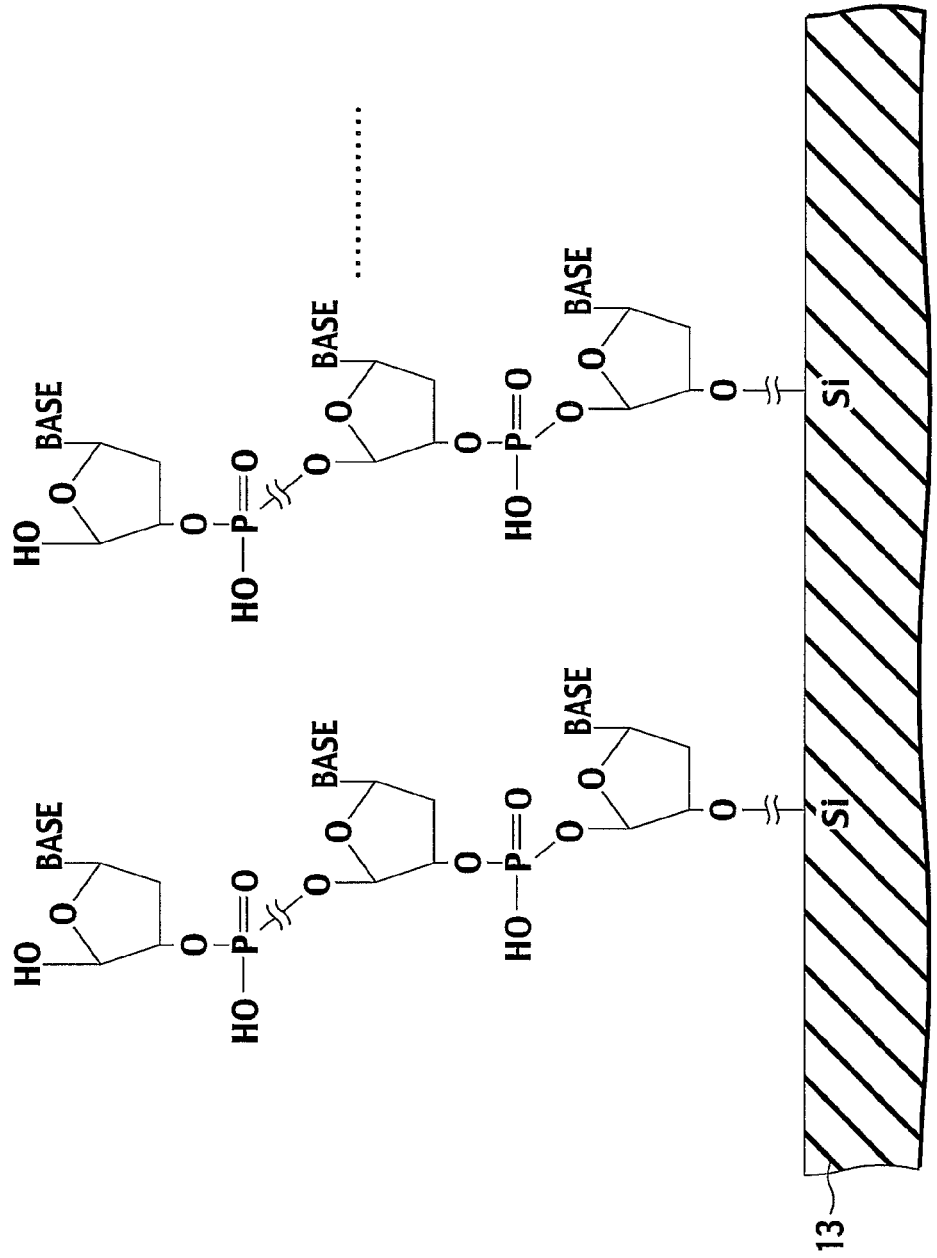
FIG. 56 is an eighteenth sectional view of the substrate for the biochip depicting the manufacturing process in accordance with the third embodiment of the present invention.

In FIG. 54, each of cyanoethyl groups protecting the phosphate linkage is cleaved by concentrated ammonia. Also, each of heterocyclic protection groups such as the benzoyl group and the isobutyl group shown in FIG. 47 is cleaved by the concentrated ammonia and each of heterocyclic primary amines is deprotected as shown in FIG. 55. Further, each DMTr on the very last bases is cleaved as shown in FIG. 56. The processes explained with FIGS. 48-56 are also performed on the silane films 81b-81i shown in FIG. 45 and the biomolecule layers 91a-91i are formed as shown in FIG. 29.

As described above, the method for manufacturing the substrate for the biochip according to the third embodiment involves treatment of the SOI substrate with the sodium hydrate solution. Therefore, the hydroxyl (—OH) groups are only introduced on the surface of the first layer 13. Also, in the case where the second layer 11 is composed of Si, the thickness of the native oxide film 12 is usually 2 nm or below. The sodium hydrate solution effectively removes such native oxide film 12 at room temperature and for two hours. Consequently, the silane coupling agents added later only react with the hydroxyl (—OH) groups on the first layer 13 and may not bind to the surface of the second layer 11. In earlier methods, the silane coupling agents may react with the remaining native oxide film 12. Therefore, the target biomolecules labeled with the fluorescent dyes may also be immobilized on the native oxide film. Such immobilized target biomolecules on the native oxide film cause background noise. Especially in micro analysis, it has been desired to develop the method to immobilize the target biomolecules only on the bottoms of the wells 1a-41i, 41b-41i, 42a-42i, 43a-43i, 44a-44i, 45a-45i, 46a-46i, 47a-47i, 48a-48i, 49a-49i and prevent the target biomolecules from binding to the surface of the second layer 11, since such method improves contrast in the fluorescence analysis. The method for manufacturing the substrate for the biochip may serve such demand since the hydroxyl (—OH) groups are only introduced on the surface of the first layer 13 and the native oxide film 12 is removed from the surface of the second layer 11. Therefore, it is possible to manufacture the substrate for the biochip that may exclude the background noise.

Figure 57:
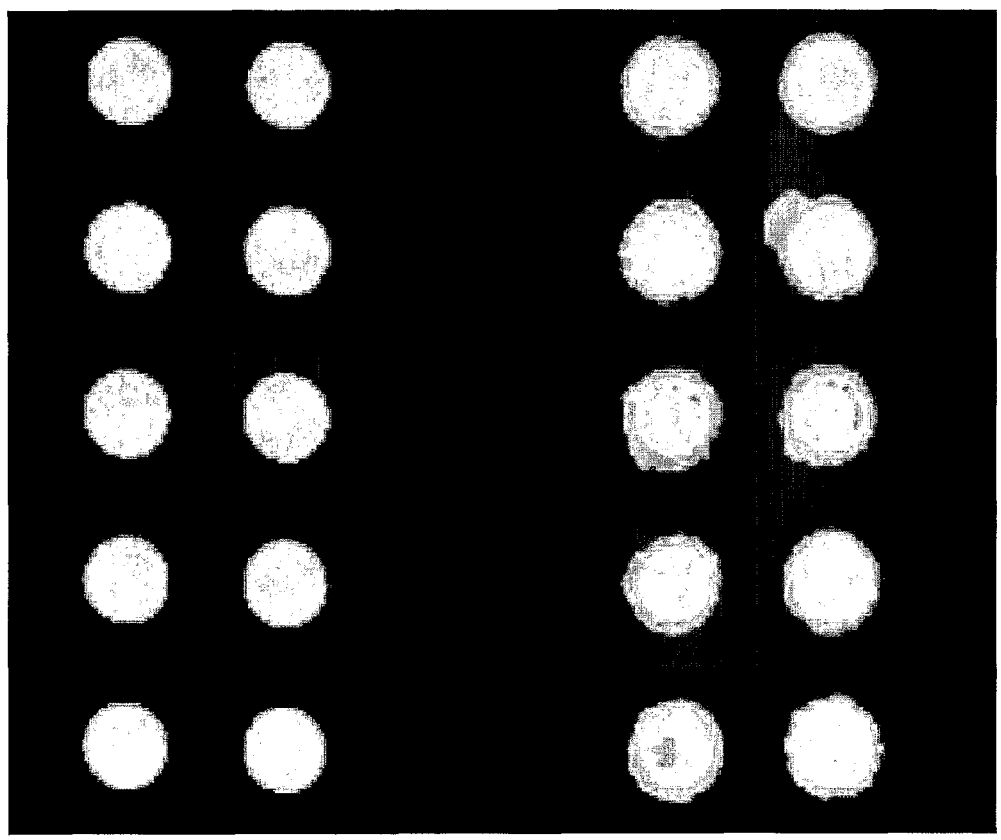
FIG. 57(a) shows a fluorescent image on the substrate for the biochip in accordance with the third embodiment of the present invention.
FIG. 57(b) shows a fluorescent image on an earlier substrate for the biochip.

FIG. 57(a) shows an example microscope image when the wells 41a-42i, 42a-42i shown in FIG. 25 are exposed to sample solution containing sample DNA labeled with the fluorescent dye and having a sequence that is complementary to a sequence of the DNA immobilized in the biomolecule layer 91a shown in FIG. 28. FIG. 57(b) shows an example microscope image when the earlier substrate for the biochip shown in FIGS. 2-7 are exposed to the sample DNA labeled with the fluorescent dye and having a sequence that is complementary to a sequence on the substrate. In the earlier substrate, the sample DNA binds to not only the bottom of the wells but also on other areas. Also, contaminations are detected on the bottom of the wells. However, the substrate for the biochip according to the third embodiment makes it possible to hybridize the target DNA only on the bottoms of the wells as shown in FIG. 57(a). Also, the uniformity of the fluorescent on the wells is realized.

In FIGS. 37-42, the grooves 31a-31i, 32a-32i, 33a-33i, 34a-34i, 35a-35i, 36a-36i, 37a-37i, 38a-38i, 39a-39h are delineated in the second layer 11 in advance. Then the wells 41a-41i, 41b-41i, 42a-42i, 43a-43i, 44a-44i, 45a-45i, 46a-46i, 47a-47i, 48a-48i, 49a-49i are delineated in the second layer 11. Contrary, it should be noted that forming the wells 41a-41i, 41b-41i, 42a-42i, 43a-43i, 44a-44i, 45a-45i, 46a-46i, 47a-47i, 48a-48i, 49a-49i in advance and then forming the grooves 31a-31i, 32a-32i, 33a-33i, 34a-34i, 35a-35i, 36a-36i, 37a-37i, 38a-38i, 39a-39h are also alternative. However, since each depth of the grooves 31a-31i, 32a-32i, 33a-33i, 34a-34i, 35a-35i, 36a-36i, 37a-37i, 38a-38i, 39a-39h is shallower than each depth of the wells 41a-41i, 41b-41i, 42a-42i, 43a-43i, 44a-44i, 45a-45i, 46a-46i, 47a-47i, 48a-48i, 49a-49i, forming the grooves 31a-31i, 32a-32i, 33a-33i, 34a-34i, 35a-35i, 36a-36i, 37a-37i, 38a-38i, 39a-39h in advance makes it easier to coat the resist on the second layer 11 uniformly.

Also, in FIGS. 45-56, the biomolecule layers 91a-91i are formed after the silane films 81a-81i on the first layer 13. However, attaching the biomolecules to the hydroxyl (—OH) groups on the first layer 13 and forming the covalent bonds without the silane films 81a-81i are also alternative.

Further, though the SOI substrate is prepared in FIG. 35, manufacturing the substrate for the biochip by using a laminate sheet consisting of a glass substrate and a polytetrafluoroethylene substrate is also available. In this case, the glass substrate is used as the first layer 13 and the polytetrafluoroethylene substrate is used as the second layer 11.

First Modification of the Third Embodiment

The method for manufacturing the substrate for the biochip is not limited to the third embodiment described above. With reference now to FIGS. 58-62, the method for manufacturing the substrate for the biochip using the epoxy negative resist is describe.

Figure 58:
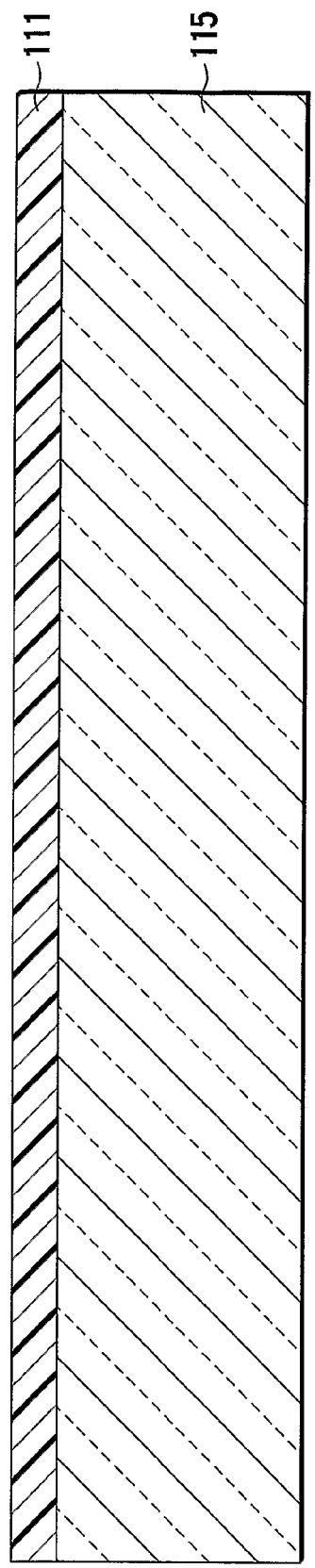
FIG. 58 is a first sectional view of a substrate for the biochip depicting a manufacturing process in accordance with a first modification of the third embodiment of the present invention.
Figure 59:
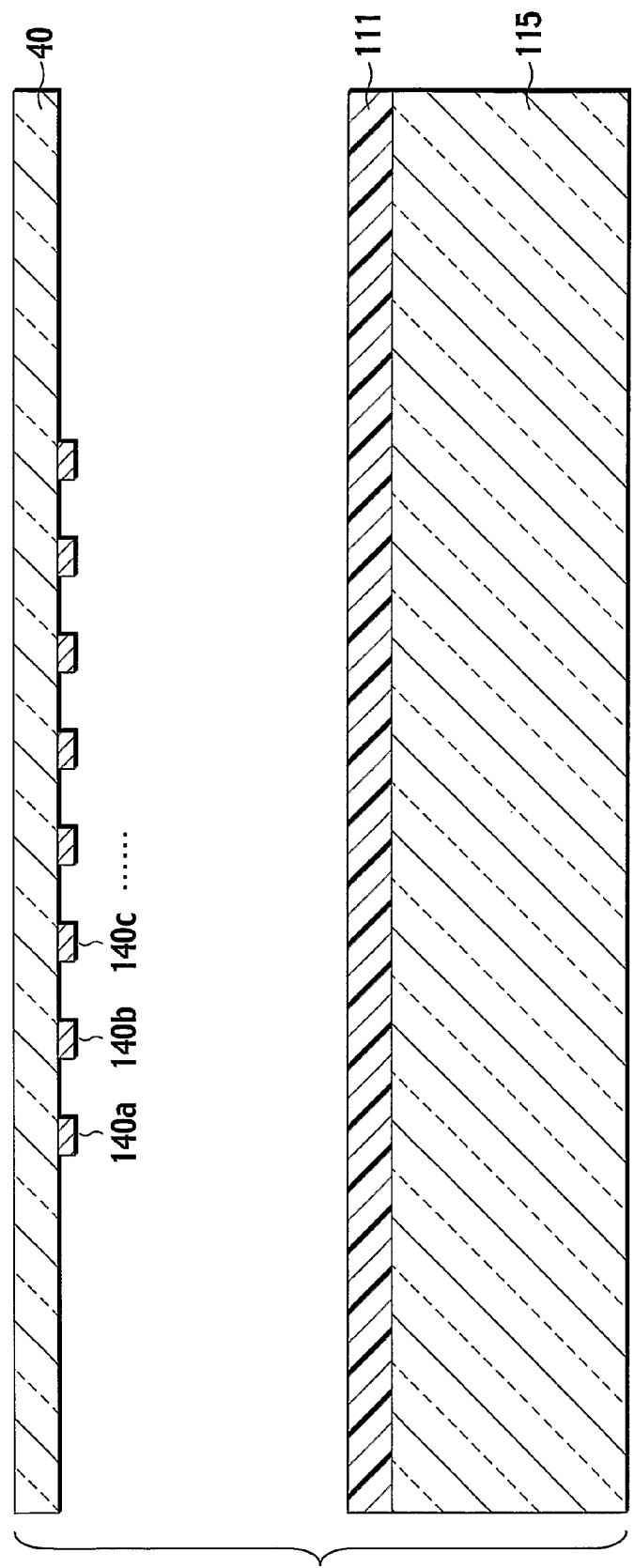
FIG. 59 is a second sectional view of the substrate for the biochip depicting the manufacturing process in accordance with the first modification of the third embodiment of the present invention.

In FIG. 58, a first resist 111 composed of the epoxy negative photo-resist is coated on the first layer composed of the glass by the spin coater, for example. Thereafter, a first photo mask 40 is prepared in FIG. 59. The first photo mask 40 has a plurality of light shield patterns 140a, 140b, 140c. The light shield patterns 140a-140c correspond to the shape of the wells to be fabricated in the first resist 111. Then, light is shone over the first photo mask 40 and the portions of the first resist 111 are exposed to the light.

Figure 60:
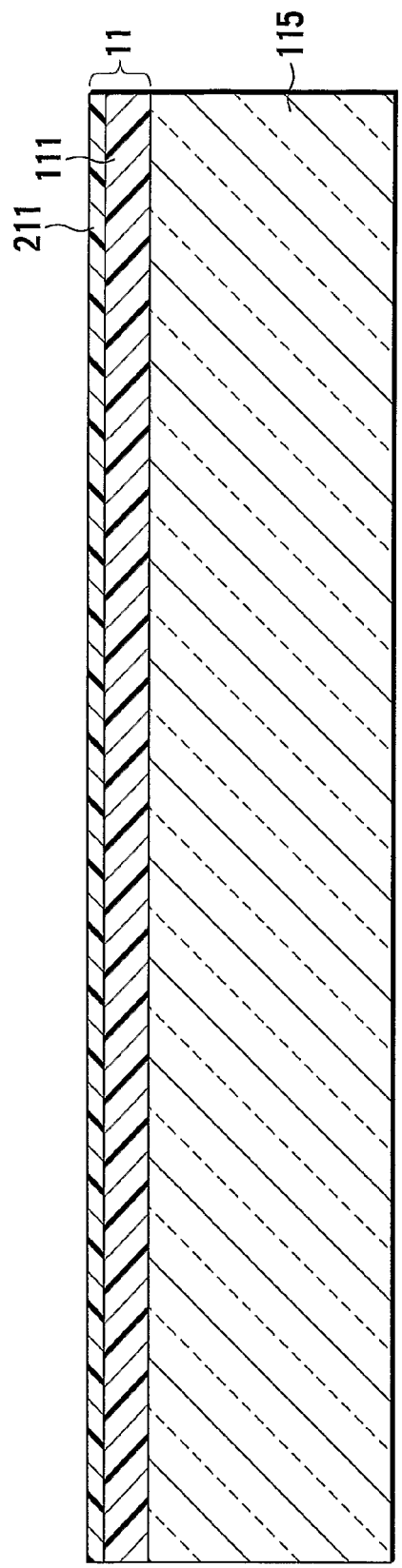
FIG. 60 is a third sectional view of the substrate for the biochip depicting the manufacturing process in accordance with the first modification of the third embodiment of the present invention.
Figure 61:
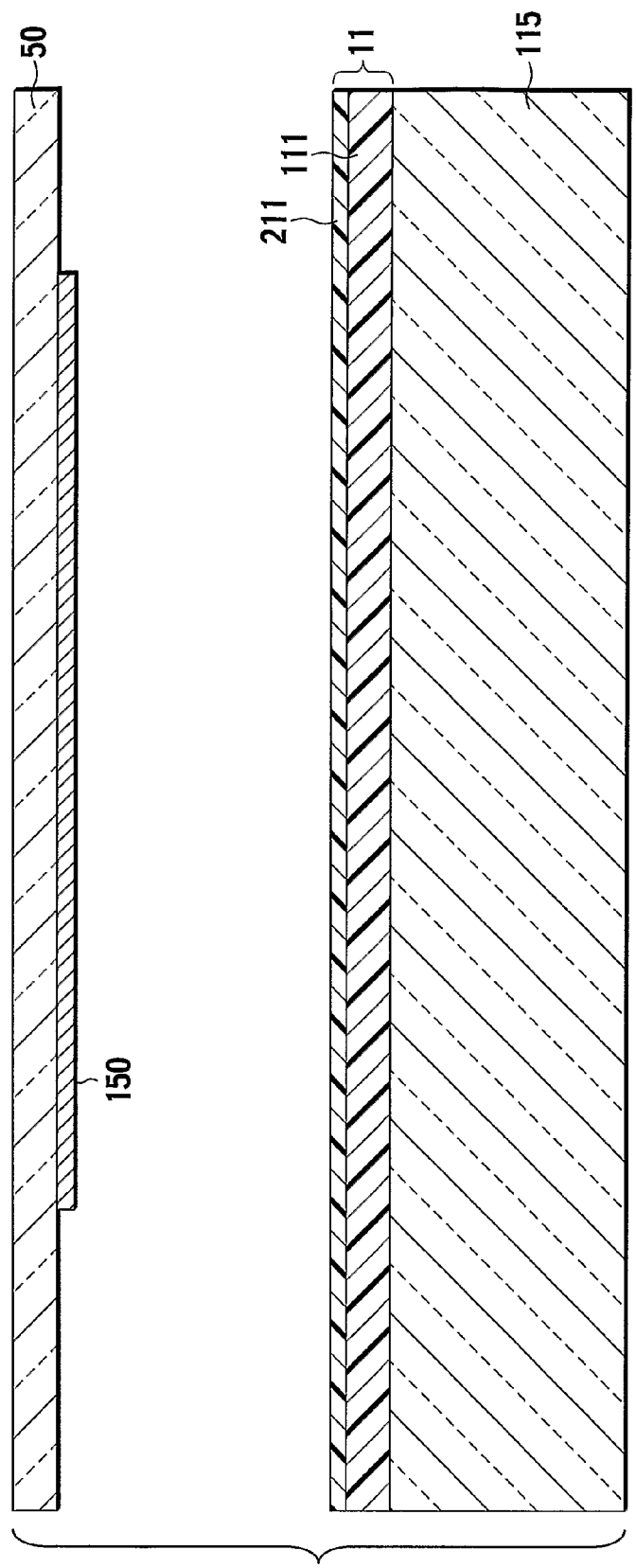
FIG. 61 is a fourth sectional view of the substrate for the biochip depicting the manufacturing process in accordance with the first modification of the third embodiment of the present invention.

In FIG. 60, a second resist 211 composed of the epoxy negative photo-resist is coated on the first resist 111 by the spin coater. Accordingly, the first resist 111 and the second resist 211 forms the second layer 11. In FIG. 61, a second photo mask 50 is prepared. The second photo mask 50 has a light shield pattern 150. The light shield pattern 150 corresponds to the shape of the wells and the grooves formed in the second layer 11. Then, the light is shone over the second photo mask 50 and the portions of the second resist 211 are exposed to the light.

Figure 62:
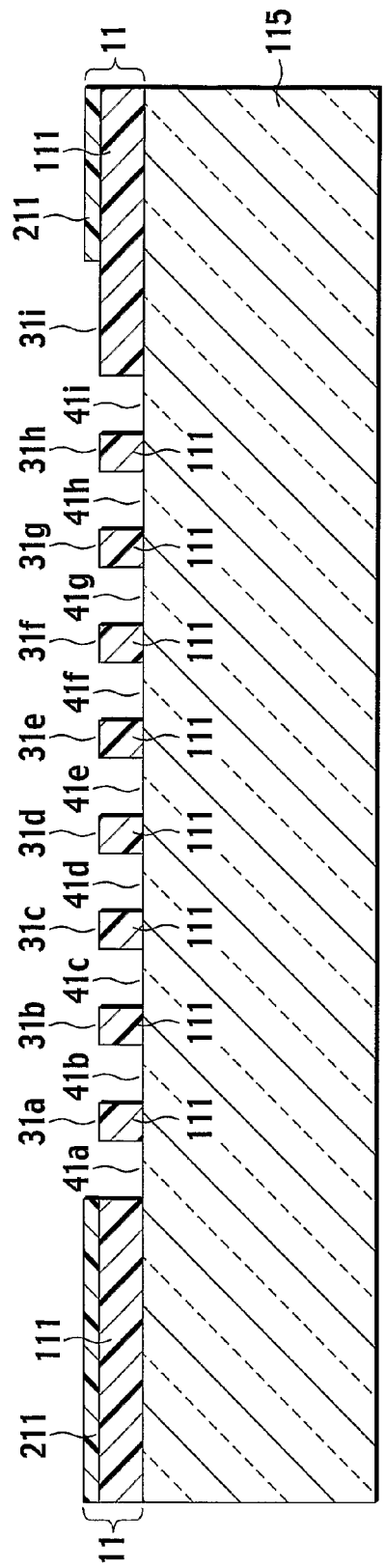
FIG. 62 is a fifth sectional view of the substrate for the biochip depicting the manufacturing process in accordance with the first modification of the third embodiment of the present invention.

The exposed first resist 111 and the exposed second resist 211 are baked. It should be noted that the post exposure bake renders the first resist 111 and the second resist 211 insoluble in buffer. Thereafter, the first resist 111 and the second resist 211 are developed with an alkaline developer. Consequently, the wells 41a-41i and the grooves 31a-31i are formed in the second layer 11 as shown in FIG. 62. Subsequently, the method explained with FIGS. 44-56 is carried out and the method for manufacturing the substrate for the biochip is completed.

Second Modification of the Third Embodiment

Figure 63:
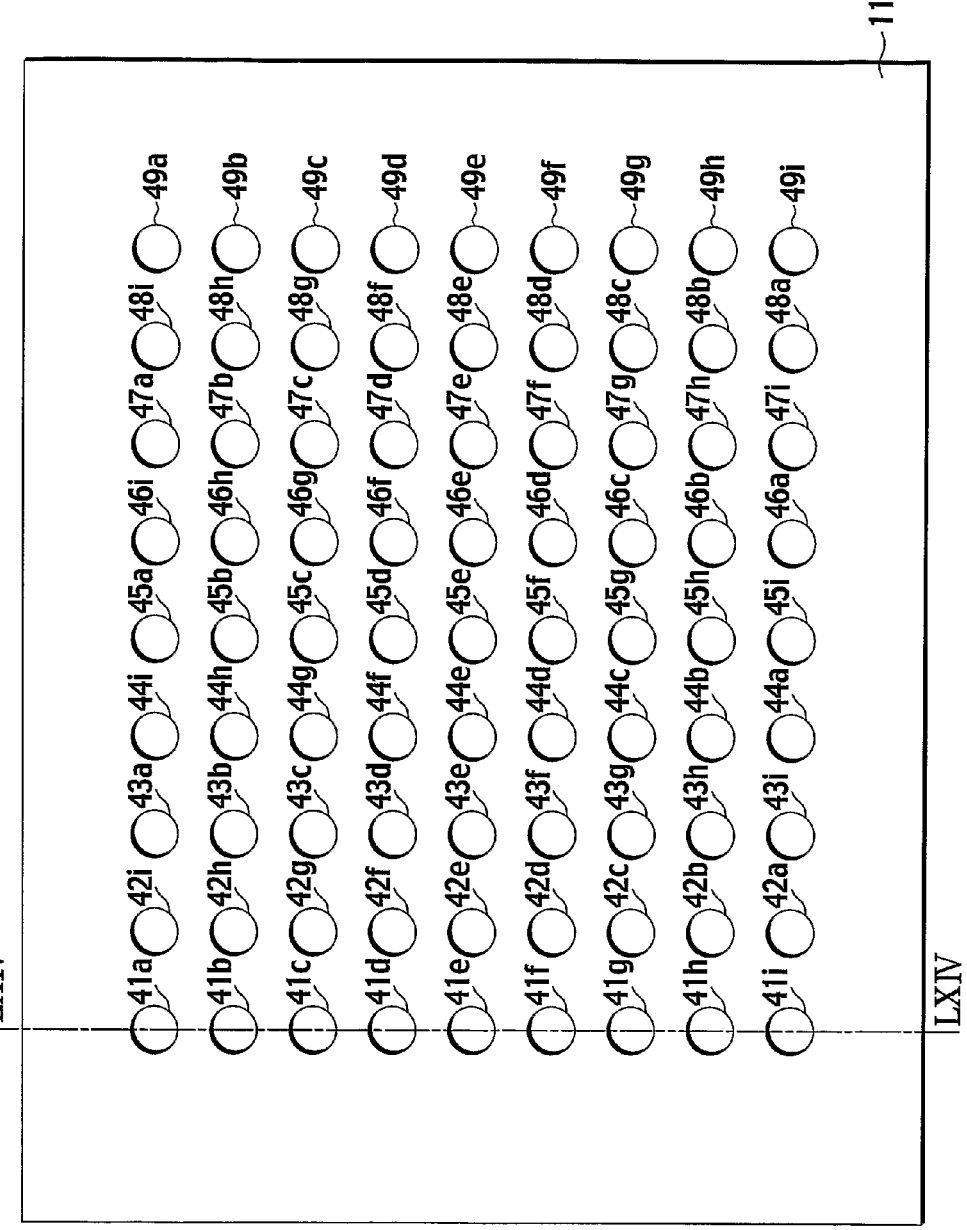
FIG. 63 is a plane view of a substrate for the biochip in accordance with a second modification of the third embodiment of the present invention.
Figure 64:
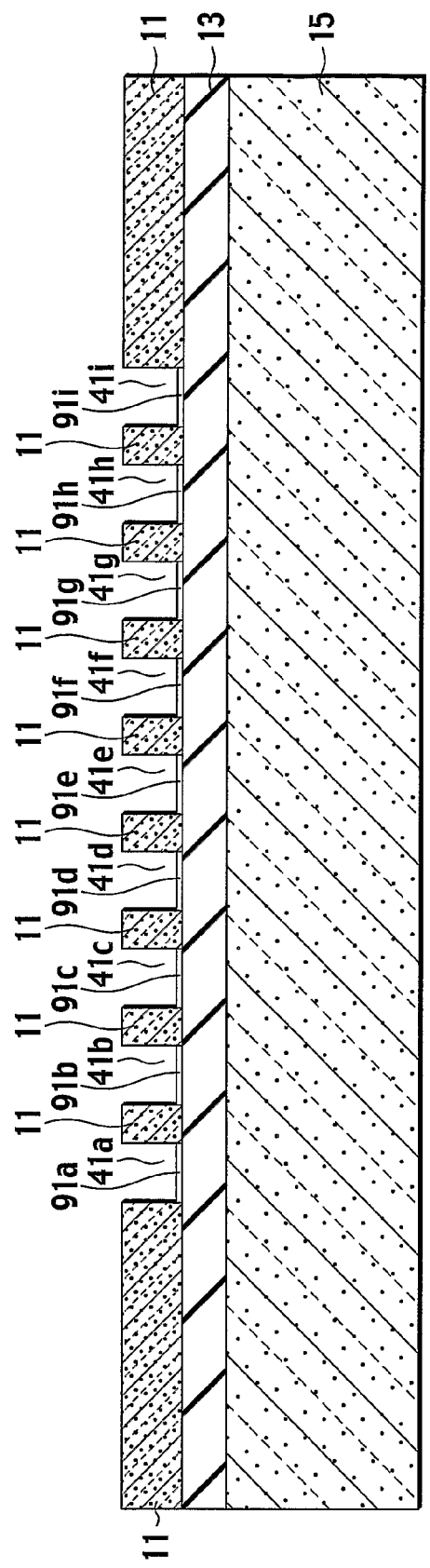
FIG. 64 is a first sectional view taken along line LXIV-LXIV in FIG. 63, showing the substrate for the biochip in accordance with the second modification of the third embodiment of the present invention.
Figure 65:
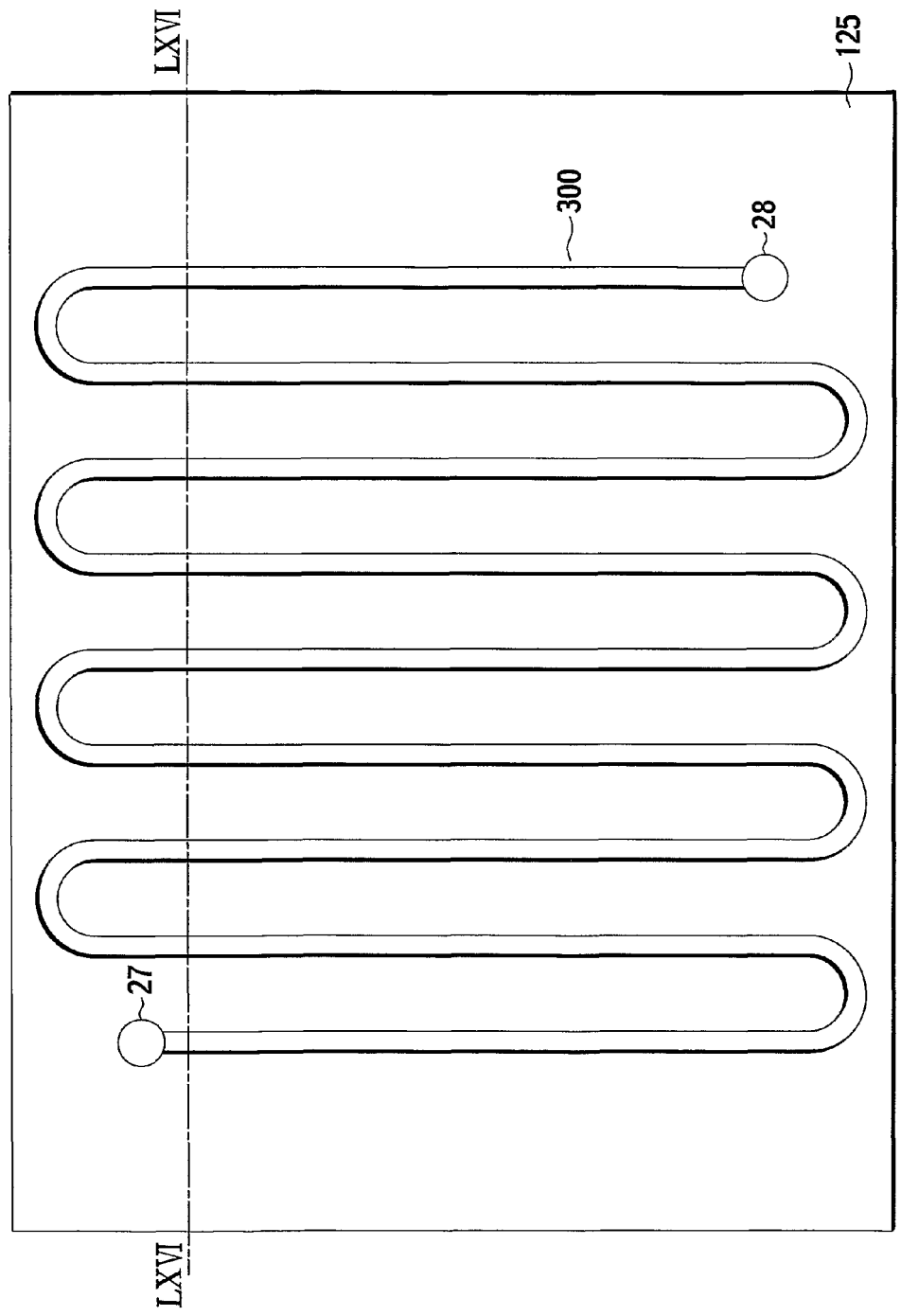
FIG. 65 is a plane view of a cover plate in accordance with the second modification of the third embodiment of the present invention.
Figure 66:
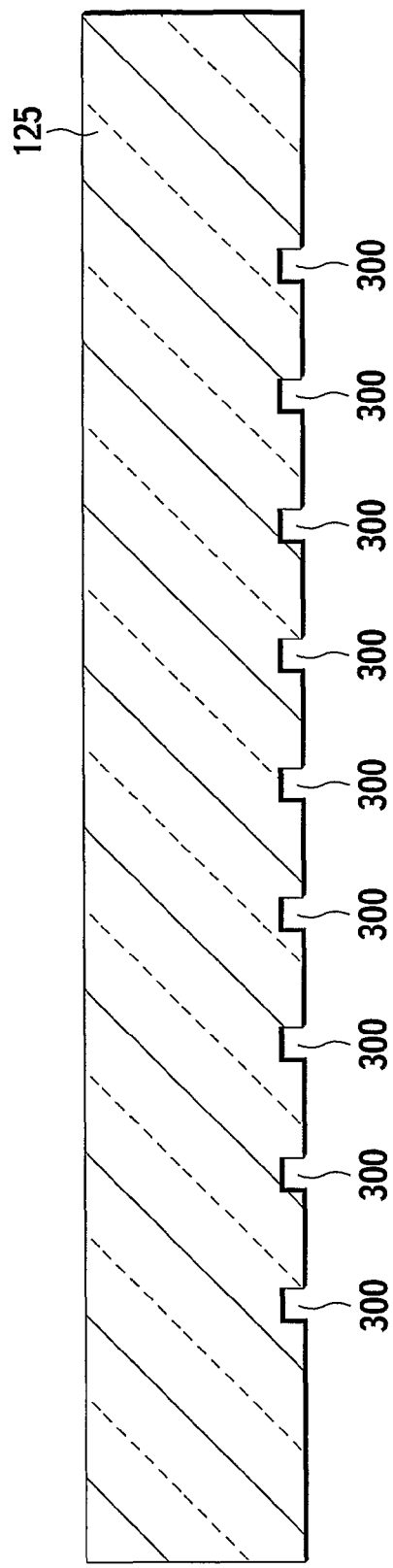
FIG. 66 is a sectional view taken along line LXVI-LXVI in FIG. 65, showing the cover plate in accordance with the second modification of the third embodiment of the present invention.

With reference now to FIGS. 63 and 64, a substrate for a biochip according to a second modification of the third embodiment differs with the substrate shown in FIGS. 25 and 26 in the absence of the grooves 31a-31i, 32a-32i, 33a-33i, 34a-34i, 35a-35i, 36a-36i, 37a-37i, 38a-38i, 39a-39h delineated in the second layer 11. With reference next to FIGS. 65 and 66, a cover plate 125 according to a second modification of the third embodiment differs with the cover plate 25 shown in FIGS. 32 and 33 in the presence of a groove 300 shown in FIGS. 65 and 66. In the case where the cover plate 125 is disposed on the substrate shown in FIGS. 63 and 64, the groove 300 connects the wells 41a-41i, 41b-41i, 42a-42i, 43a-43i, 44a-44i, 45a-45i, 46a-46i, 47a-47i, 48a-48i, 49a-49i.

Figure 67:
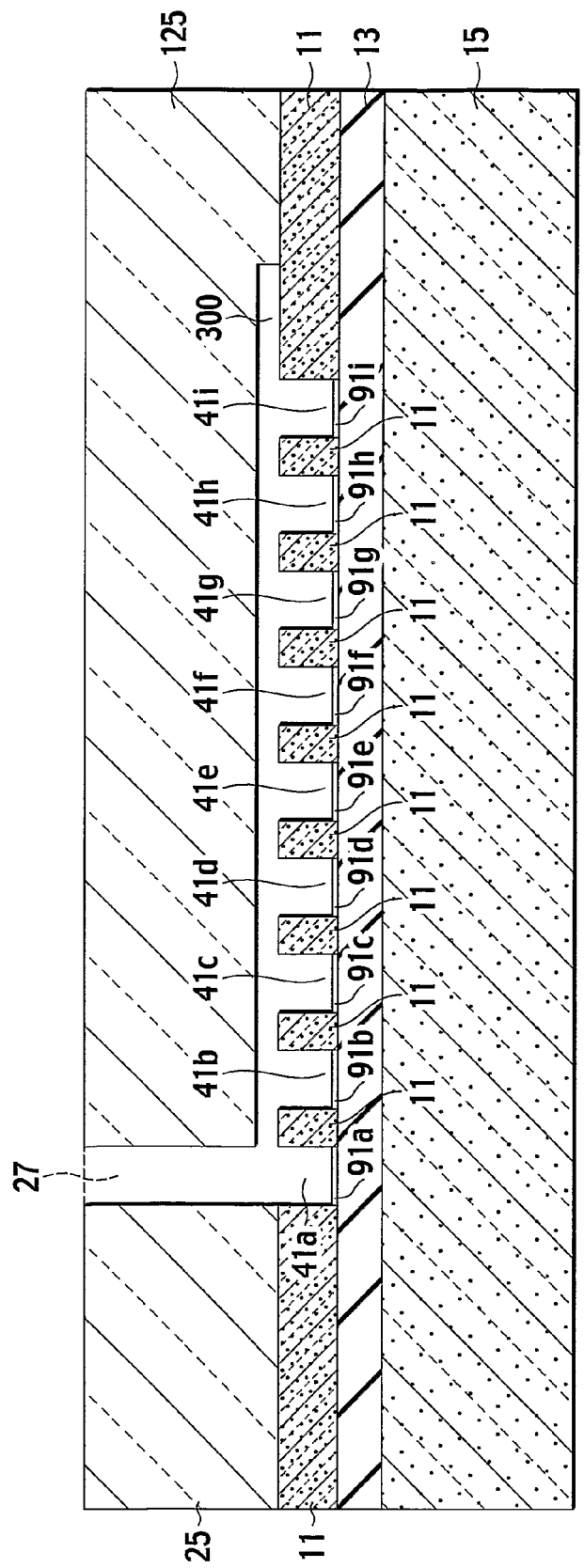
FIG. 67 is a sectional view of the cover plate on the substrate for the biochip in accordance with the second modification of the third embodiment of the present invention.

FIG. 67 depicts a sectional view in the case where the cover plate 25 shown in FIG. 65 is disposed on the substrate for the biochip shown in FIG. 63. The sample solution dispensed into the opening 27 may fill the well 41a. Thereafter, the sample solution flows the groove 300 and fills the wells 41b-41i in order. Therefore, as similar to the third embodiment, the substrate for the biochip shown in FIG. 63 and the cover plate 25 shown in FIG. 65 makes it possible to reduce the volume of the sample solution.

This application is based upon and claims the benefit of priority from prior European Patent Application 04291742.7 filed on Jul. 8, 2004; the entire contents of which are incorporated by reference herein.

INDUSTRIAL APPLICABILITY

As is clear from the description of the substrate for synthesizing probe DNA, in the substrate for biochips according to the present invention, the boundary between the reaction region for synthesizing biological substances and the non-reaction region is quite definite. Hence, a biochip made using this substrate makes it possible to detect to-be-detected biological substances stably and with high accuracy.

Further, in the case of the substrate according to the invention, sites forming the reaction region are formed by photolithography and etching in the process of making the substrate. This increases the freedom of formation and enables fine patterns and therefore high-density formation of the reaction region. Further, since the making process does not need to include the steps of filling the bottomed wells with resin droplets and then performing inactivation treatment, the overall production costs decrease.

As a substrate used for making DNA chips, RNA chips, protein chips, antibody chips, sugar chain fixing chips, bioreactors and the like, this substrate for biochips has a large industrial value.

The invention claimed is:

1. A substrate for a biochip, wherein:
the substrate comprises a silicon on insulator wafer including a first silicon layer, a silicon oxide layer disposed on the first silicon layer, and a second silicon layer disposed on the silicon oxide layer,
the silicon oxide layer treated for a capability of reacting with biological substances,
the second silicon layer does not react with the biological substances,
wherein a plurality of wells are formed in the second silicon layer, and
the silicon oxide layer capable of reacting with the biological substances is exposed at the bottoms of the plurality of wells.

2. The substrate of claim 1, wherein the exposed surface of said silicon oxide layer is silanized.

3. The substrate of claim 1, further comprising:
the first layer having a surface to be hydroxylated; and
the second layer disposed on the first layer, the second layer having a plurality of wells reaching to the first layer and a plurality of grooves configured to fill the wells with a same solution.

4. The substrate of claim 3, wherein the first layer has higher hydrophilicity than the second layer.

5. The substrate of claim 3, wherein the first layer contains a silicon dioxide.

6. The substrate of claim 3, wherein the second layer contains a crystal silicon.

7. The substrate of claim 3, wherein the second layer contains a resin.

8. The substrate of claim 3, further comprising a biomolecule layer having a plurality of probe biomolecules linked to a plurality of hydroxyl groups to be introduced on the first layer.

9. The substrate of claim 8, wherein each of the probe biomolecules and each of the hydroxyl groups are linked by a silane coupling agent.

10. The substrate of claim 8, wherein each of the probe biomolecules contains a deoxyribonucleic acid.

11. The substrate of claim 8, wherein each of the probe biomolecules contains a ribonucleic acid.

12. The substrate of claim 8, wherein each of the probe biomolecules contains a peptide.

13. The substrate of claim 8, wherein each of the probe biomolecules contains a protein.

* * * * *